US012695365B2

(12) United States Patent
Schmidt et al.

(10) Patent No.: US 12,695,365 B2
(45) Date of Patent: Jul. 28, 2026

(54) ELECTRIC MOTOR HAVING A SENSOR CONFIGURED TO MEASURE VARIABLES OF THE COILS OF THE MOTOR

(71) Applicant: Vorwerk & Co. Interholding GmbH, Wuppertal (DE)

(72) Inventors: Dirk Schmidt, Wipperfürth (DE); Patrick Seibt, Monheim am Rhein (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 281 days.

(21) Appl. No.: 18/209,574

(22) Filed: Jun. 14, 2023

(65) Prior Publication Data

US 2023/0412054 A1 Dec. 21, 2023

(30) Foreign Application Priority Data

Jun. 15, 2022 (EP) ..................................... 22179240

(51) Int. Cl.
H02K 15/026 (2025.01)
A47J 43/046 (2006.01)
(Continued)

(52) U.S. Cl.
CPC .......... H02K 15/026 (2013.01); A47J 43/046 (2013.01); A47J 43/085 (2013.01);
(Continued)

(58) Field of Classification Search
CPC ...... H02K 15/026; H02K 1/146; H02K 3/345; H02K 3/525; H02K 3/522; H02K 2203/12; H02K 5/225
(Continued)

(56) References Cited

U.S. PATENT DOCUMENTS 5,829,120 A 11/1998 Uchida et al.
9,246,364 B2 1/2016 Brahmavar et al.
(Continued)

FOREIGN PATENT DOCUMENTS

CN 103023262 A 4/2013
CN 104620477 A * 5/2015 ............... H02K 3/28
(Continued)

OTHER PUBLICATIONS

U.S. Appl. No. 18/209,565, filed Jun. 14, 2023, Schmidt et al.
U.S. Appl. No. 18/209,570, filed Jun. 14, 2023, Schmidt et al.

*Primary Examiner* — Oluseye Iwarere
*Assistant Examiner* — Daniel K Schlak
(74) *Attorney, Agent, or Firm* — Jason H. Vick; Amped IP LLC

(57) ABSTRACT

An electric motor, in particular for a kitchen machine, is proposed, wherein the stator of the electric motor has a stator core, a plurality of coils and a coil carrier. The coil carrier is produced in one piece by injection molding onto the stator core and has at least one holder arranged radially on the outside of the stator core, the holder holding a connection device and/or a sensor device. Further, a kitchen machine having a corresponding electric motor is proposed. Furthermore, a method of manufacturing an electric motor is proposed, in which a coil carrier of the stator is produced by injection molding to a stator core, the coil carrier being produced with at least one holder arranged radially outside the stator core and adapted to hold a connection device and/or a sensor device.

22 Claims, 9 Drawing Sheets

(51) Int. Cl.

| | |
|---|---|
| *A47J 43/08* | (2006.01) |
| *H02K 1/14* | (2006.01) |
| *H02K 3/34* | (2006.01) |
| *H02K 3/50* | (2006.01) |
| *H02K 3/52* | (2006.01) |
| *H02K 5/22* | (2006.01) |
| *H02K 11/20* | (2016.01) |
| *H02K 11/25* | (2016.01) |
| *H02K 15/022* | (2025.01) |
| *H02K 15/03* | (2006.01) |
| *H02K 21/16* | (2006.01) |

(52) U.S. Cl.
CPC .............. *H02K 3/345* (2013.01); *H02K 3/50* (2013.01); *H02K 5/225* (2013.01); *H02K 11/20* (2016.01); *H02K 15/022* (2013.01); *H02K 15/03* (2013.01); *H02K 21/16* (2013.01); *H02K 1/146* (2013.01); *H02K 3/522* (2013.01); *H02K 11/25* (2016.01); *H02K 2203/12* (2013.01)

(58) Field of Classification Search
USPC .......................................................... 310/194
See application file for complete search history.

(56) References Cited

U.S. PATENT DOCUMENTS

| | | | |
|---|---|---|---|
| 2001/0011854 A1* | 8/2001 | Heyden .................. | H02K 11/25 |
| | | | 310/254.1 |
| 2003/0222521 A1* | 12/2003 | Mimura ................. | G01D 11/30 |
| | | | 310/71 |
| 2008/0036315 A1* | 2/2008 | Makiuchi ............. | G01D 11/245 |
| | | | 310/71 |
| 2008/0084139 A1* | 4/2008 | Schroer ................. | H02K 3/522 |
| | | | 310/67 R |
| 2008/0122300 A1* | 5/2008 | Cho ....................... | H02K 21/22 |
| | | | 310/43 |
| 2008/0150376 A1 | 6/2008 | Isoda et al. | |
| 2008/0169714 A1* | 7/2008 | Kataoka ................. | H02K 29/12 |
| | | | 310/71 |
| 2009/0309441 A1* | 12/2009 | Yang ...................... | H02K 29/08 |
| | | | 310/68 B |
| 2010/0052461 A1* | 3/2010 | Sasaki .................... | H02K 3/522 |
| | | | 310/215 |
| 2010/0181852 A1* | 7/2010 | Kobayashi ............. | H02K 3/525 |
| | | | 310/71 |
| 2011/0290581 A1 | 12/2011 | Neubauer et al. | |
| 2012/0112580 A1* | 5/2012 | Sato ....................... | H02K 11/25 |
| | | | 310/71 |
| 2013/0009513 A1* | 1/2013 | Jang ....................... | H02K 3/522 |
| | | | 310/254.1 |
| 2013/0221787 A1 | 8/2013 | Kritharidou et al. | |
| 2014/0103768 A1 | 4/2014 | Brahmavar et al. | |
| 2014/0125160 A1* | 5/2014 | Nara ........................ | H02K 5/24 |
| | | | 310/51 |

| | | | |
|---|---|---|---|
| 2014/0159520 A1* | 6/2014 | Jang ...................... | H02K 1/146 |
| | | | 310/71 |
| 2015/0145367 A1 | 5/2015 | Li et al. | |
| 2015/0194852 A1* | 7/2015 | Kim ......................... | H02K 3/30 |
| | | | 310/43 |
| 2015/0249375 A1* | 9/2015 | Andrieux .............. | H02K 3/522 |
| | | | 310/43 |
| 2015/0303751 A1 | 10/2015 | Ekin et al. | |
| 2016/0172916 A1 | 6/2016 | El Baraka et al. | |
| 2016/0197530 A1 | 7/2016 | Fuji et al. | |
| 2016/0282147 A1* | 9/2016 | Sano ....................... | G01P 3/488 |
| 2017/0256995 A1* | 9/2017 | Lam ...................... | H02K 15/022 |
| 2017/0268904 A1* | 9/2017 | Ozaki ..................... | H02K 24/00 |
| 2017/0288518 A1* | 10/2017 | Matsuura ............... | H02K 1/146 |
| 2017/0338715 A1* | 11/2017 | Li ........................... | H02K 1/146 |
| 2018/0316235 A1* | 11/2018 | Yamada ................. | H02K 15/10 |
| 2019/0036413 A1* | 1/2019 | Yamamoto ......... | F04D 29/0513 |
| 2019/0372435 A1* | 12/2019 | Song ...................... | H02K 11/25 |
| 2020/0003216 A1* | 1/2020 | Cho ..................... | A47L 15/4225 |
| 2020/0076259 A1* | 3/2020 | Hackl .................... | H02K 1/185 |
| 2020/0251942 A1 | 8/2020 | Ueda et al. | |
| 2021/0006118 A1* | 1/2021 | Echizen ............... | H02K 11/21 |
| 2021/0242731 A1* | 8/2021 | Beyerl ...................... | B25F 5/02 |
| 2021/0249928 A1* | 8/2021 | Wang ....................... | H02K 5/10 |
| 2021/0384793 A1* | 12/2021 | Bailey ................... | H02K 7/083 |
| 2022/0006347 A1* | 1/2022 | Fujii ........................ | H02K 9/06 |
| 2022/0085697 A1* | 3/2022 | Shinoda ................. | H02K 1/27 |
| 2022/0085698 A1* | 3/2022 | Niwa ...................... | H02P 29/60 |
| 2023/0119735 A1* | 4/2023 | Chikaraishi .......... | H02K 11/215 |
| | | | 310/216.001 |
| 2023/0387761 A1 | 11/2023 | Silvery et al. | |
| 2025/0038586 A1* | 1/2025 | Cho ........................ | H02K 1/16 |

FOREIGN PATENT DOCUMENTS

| | | | | | |
|---|---|---|---|---|---|
| CN | 212085915 U | | 12/2020 | | |
| DE | 202009005531 U1 | | 8/2010 | | |
| DE | 102010039334 A1 | | 2/2012 | | |
| DE | 102012101757 A1 | | 9/2013 | | |
| DE | 102012206475 A1 | | 10/2013 | | |
| DE | 102014117380 A1 | | 5/2015 | | |
| DE | 102017206091 B3 | | 10/2018 | | |
| DE | 102020120233 A1 | | 2/2022 | | |
| DE | 102020126632 A1 | | 4/2022 | | |
| EP | 0438981 A1 | | 7/1991 | | |
| EP | 1420499 A1 | | 5/2004 | | |
| EP | 1557928 A1 | | 5/2005 | | |
| EP | 1796246 B1 | | 3/2010 | | |
| EP | 1656724 B1 | | 4/2011 | | |
| EP | 1656726 B1 | | 4/2012 | | |
| EP | 2830198 A2 | * | 1/2015 | ............ | H02K 11/25 |
| EP | 3618229 A1 | | 3/2020 | | |
| EP | 4007125 A1 | | 6/2022 | | |
| JP | H08-98466 A | | 4/1996 | | |
| JP | 2014195345 A | * | 10/2014 | ............. | H02K 3/34 |
| KR | 20080067416 A | | 7/2008 | | |
| KR | 20100063380 A | * | 6/2010 | ............ | H02K 11/25 |
| WO | WO 2017/076461 A1 | | 5/2017 | | |
| WO | WO 2018/030611 A1 | | 2/2018 | | |

\* cited by examiner

ELECTRIC MOTOR HAVING A SENSOR CONFIGURED TO MEASURE VARIABLES OF THE COILS OF THE MOTOR

CROSS-REFERENCE TO RELATED APPLICATIONS

This application claims the benefit under 35 U.S.C. 119(a) to European Patent Application No. 22 179 240.1, filed Jun. 15, 2022, the disclosure of which is incorporated herein by reference in its entirety.

BACKGROUND

The present invention relates to an electric motor, in particular for a kitchen machine, a kitchen machine having an electric motor, and a method of manufacturing an electric motor.

Electric motors, for example in the form of brushless DC motors (BLDC motors) or switched reluctance motors (SR motors), are known from the prior art and have a stator and a rotor rotating relative to the stator.

In brushless DC motors, the stator is equipped with stator coils and the rotor with permanent magnets. The permanent magnets can be provided on the outside of the rotor core (SPM—Surface Permanent Magnet) or embedded in the rotor core (IPM—Interior Permanent Magnet).

In switched reluctance motors, the stator is also equipped with stator coils, but the rotor has no permanent magnets or coils, but consists exclusively of electrical sheet or the like. The torque in the rotor is generated here exclusively by the reluctance force.

SUMMARY

The present invention is directed to providing an electric motor, a kitchen machine having an electric motor, and a method of manufacturing an electric motor, wherein the electric motor has a simple, compact, stable and/or cost-effective construction, and/or enables simple, fast, compact, stable and/or cost-effective assembly/manufacturing, and/or wherein the electric motor has efficient running, low noise emission, good heat dissipation and/or high power density.

The problem is solved by an electric motor, a kitchen machine or a method according to as disclosed herein.

The electric motor according to the proposal has a (fixed) stator and a rotor rotatable relative to the stator about a rotation axis.

The stator has a stator body/stator core which is formed in particular by stator sheets/stator laminations and/or electrical sheets/electrical laminations stacked one on top of the other. The stator core is therefore preferably a lamination/sheet stack or laminated stator core.

The stator and/or stator core is preferably at least essentially annular and/or concentrically surrounds the rotor. The ring axis and/or symmetry axis of the stator and/or stator core preferably corresponds to the rotation axis.

The stator has a plurality of coils and a coil carrier for the coils. Preferably, the coil carrier has corresponding winding portions on which the coils are respectively wound and/or which hold/carry/support the coils.

According to one aspect of the present invention, the coil carrier is integrally formed by injection molding (on)to or around the stator core.

By injection molding, it is preferably possible to achieve low wall thicknesses of the coil carrier, in particular lower wall thicknesses than with solutions known from the prior art, such as a two-piece coil carrier which is plugged onto the stator core. This allows a more compact design of the electric motor and/or stator, in particular more space for turns of the coils.

Moreover, injection molding leads to a stiffer and/or more stable stator and/or ensures that the coil carrier is in direct contact with the stator core, is positively connected to the stator core in all spatial directions and/or is materially and/or adhesively bonded to the stator core. This prevents or at least reduces oscillation of the coil carrier during operation of the electric motor. This advantageously leads to more efficient running, lower noise emission and/or higher power density.

Furthermore, a preferably improved heat dissipation can be achieved by the injection molding. On the one hand, the coil carrier has a less insulating effect due to its lower wall thickness, so that the waste heat from the coils can be dissipated better. On the other hand, heat dissipation is also improved by direct contact between the coil carrier and the stator core since air gaps or the like with an insulating effect can be avoided.

In addition, there is no need for subsequent assembly of the coil carrier to the stator core, which is conducive to simple, fast and/or cost-effective manufacture.

According to a further aspect of the present invention, which can also be implemented independently, the coil carrier has at least one holder which is arranged radially on the outside of the stator core and/or on the outer circumference of the stator core, and in particular engages over the stator core. The holder holds a connection device and/or a sensor device or parts thereof. Particularly preferably, the holder is formed integrally on/with/by the coil carrier.

The connection device and/or sensor device can be held and/or arranged in a particularly simple and/or compact manner by means of the holder. In particular, no installation space is required inside the stator. In addition, the holder, connection device and/or sensor device are easily accessible from the outside, which simplifies assembly.

The connection device can have electrical connection contacts for power supply of the electric motor, in particular the coils, and/or a star point of the interconnection of the coils. In an advantageous manner, the connection contacts and/or the star point are held by the holder radially on the outside of the stator core, thus requiring no installation space inside the stator and/or being more easily electrically accessible. For example, a potential of the star point can be tapped for motor control.

Particularly preferably, the connection device holds a terminal which forms the star point and/or in which the coil wires of the different coils are brought together to form a star point. This is conducive to particularly simple, fast and/or cost-effective manufacture/assembly. Alternatively, the coil wires can also be soldered or welded to form a star point.

The sensor device can have one or more sensors, in particular a temperature sensor and/or a Hall sensor. Preferably, the temperature sensor detects the temperature of the electric motor, in particular of the stator and/or the coils, and/or the Hall sensor detects the angle of rotation and/or the rotational speed of the electric motor and/or rotor. The Hall sensor is thus preferably designed as an angle of rotation sensor. Alternatively or additionally, however, the Hall sensor can also be provided and/or used for other measurements, and/or an angle of rotation detection can be performed by another sensor, for example a light barrier. The sensor(s) thus preferably enable(s) monitoring and/or feedback control of the temperature and/or speed of the electric motor, so that efficient running and/or high-power density is ensured.

The sensor(s) may be directly attached/fastened to the holder. However, it is also possible that only electrical connection contacts of the sensor device for corresponding sensors are directly attached/fastened to the holder. Consequently, the sensor(s) may also be held only indirectly by the holder via a corresponding connection. In an advantageous manner, such a connection is held by the holder radially on the outside of the stator core, thus requiring no installation space inside the stator and/or being more easily electrically accessible.

Multiple holders spaced apart from one another may also be provided. Particularly preferably, two holders are provided, wherein one of the holders is designed as a connection holder and holds the connection device and the other of the holders is designed as a sensor holder and holds the sensor device. This provides a simpler and/or more compact design, as the devices are or can be better distributed around the stator core. In particular, the individual holders can then be made smaller and/or more compact, since not all the devices have to be arranged on one holder. It is also possible to provide more than two holders, for example for multiple sensors.

Particularly preferably, the coil carrier is manufactured/produced in one piece by injection molding onto the stator core and the proposed holder(s) are provided. The holder or each holder, which is in particular (respectively) a portion or part of the one-piece coil carrier, is then molded onto the stator core (on the outside). This achieves corresponding and synergistic advantages, in particular a simple and cost-effective design and/or manufacture, more efficient running, lower noise emission and/or higher power density.

In general, the electric motor according to the proposal has low noise emission, high power density and/or wide speed spread.

A wide speed spread means that the electric motor can be operated over a wide speed range, in particular at both low and high speeds. Particularly preferably, speeds of rpm to 10,000 rpm can be realized with the electric motor according to the proposal.

In addition, the full torque can preferably be called up at standstill and/or the electric motor can be controlled in a defined manner, in particular rotated in defined small angular ranges.

Another aspect of the present invention, which can also be implemented independently, relates to a method of manufacturing an electric motor and/or a stator for an electric motor, in which a coil carrier of the stator is produced by injection molding onto a stator core and/or in which a coil carrier is produced with at least one holder which is arranged radially on the outside of the stator core and is designed to hold a connection device and/or a sensor device.

In particular, in the method according to the proposal, the coil carrier is manufactured/produced in such a way that it engages around the stator core and/or is materially and/or adhesively bonded to the stator core and/or forms a form fit with the stator core in the axial direction, in the radial direction and in the circumferential direction.

Corresponding advantages can be achieved by the method according to the proposal. In particular, the electric motor described above or its stator can be manufactured by means of the method according to the proposal.

Another aspect of the present invention, which can also be implemented independently, relates to a kitchen machine having an electric motor according to the proposal and/or having an electric motor manufactured using the method according to the proposal.

The kitchen machine according to the proposal is driven by the electric motor, in particular for chopping and/or stirring or mixing food. Particularly preferably, the kitchen machine has a stirrer, a cutter or the like which can be set in rotation by the electric motor.

By using the proposed electric motor in a kitchen machine, corresponding advantages can be achieved. In particular, the low noise emission, efficient running and/or improved controllability are advantageous.

In addition, the wide speed range in which the electric motor can operate is particularly advantageous when used in a kitchen machine. Depending on the set speed of the electric motor, both stirring/mixing of food and comminuting/chopping of food can be achieved. In this case, the proposed electric motor preferably also permits slow stirring/mixing, which allows a greater variety of recipes. In addition, a defined comminution/chopping of ingredients is preferably also made possible, which is conducive to better preparation and/or better appearance of the food.

Furthermore, the proposed electric motor can be arranged in a particularly space-saving manner in the kitchen machine due to its compact, flat and/or simple design/construction.

In principle, however, the electric motor can also be used in other devices, for example a vacuum cleaner or vacuum robot.

The spatial assignments, arrangements and/or orientations, in particular the terms "radial", "axial" and/or "circumferential" used in the context of the present invention, refer in particular to the rotation axis of the rotor and/or a rotor shaft of the rotor, unless otherwise specified.

If only the stator is described, the corresponding terms preferably refer to the (imaginary) rotation axis when the rotor inserted. However, the terms can also refer to the ring axis/symmetry axis of the stator and/or stator core, which preferably coincides with the rotation axis.

Terms such as "above", "below" and the like preferably refer to the extension of the rotation axis of the rotor and/or symmetry axis of the stator or stator core. In particular, "top" refers to one axial end face of the component concerned, in particular the electric motor, rotor, rotor core, stator and/or stator core, and "bottom" refers to the other or opposite axial end face of the component concerned, in particular the electric motor, rotor, rotor core, stator and/or stator core.

The terms are used here according to the preferred orientation of the electric motor. However, it should be noted that the installation of the electric motor in a kitchen machine or other device can also be carried out in a different orientation.

The aforementioned aspects, features and method steps as well as the aspects, features and method steps of the present invention resulting from the claims and the following description can in principle be realized independently of each other, but also in any combination and/or sequence.

Further aspects, advantages, features, characteristics as well as advantageous further developments of the present invention result from the claims and the following description of preferred embodiments on the basis of the accompanying drawings.

DETAILED DESCRIPTION

In the figures, some of which are not to scale and are merely schematic, the same reference signs are used for the same, similar or like parts and components, wherein corresponding or comparable properties or advantages are achieved, even if repetition is omitted.

For better clarity, in the case of identical parts and components within a figure, not all parts/components are given a reference sign.

Figure 1:
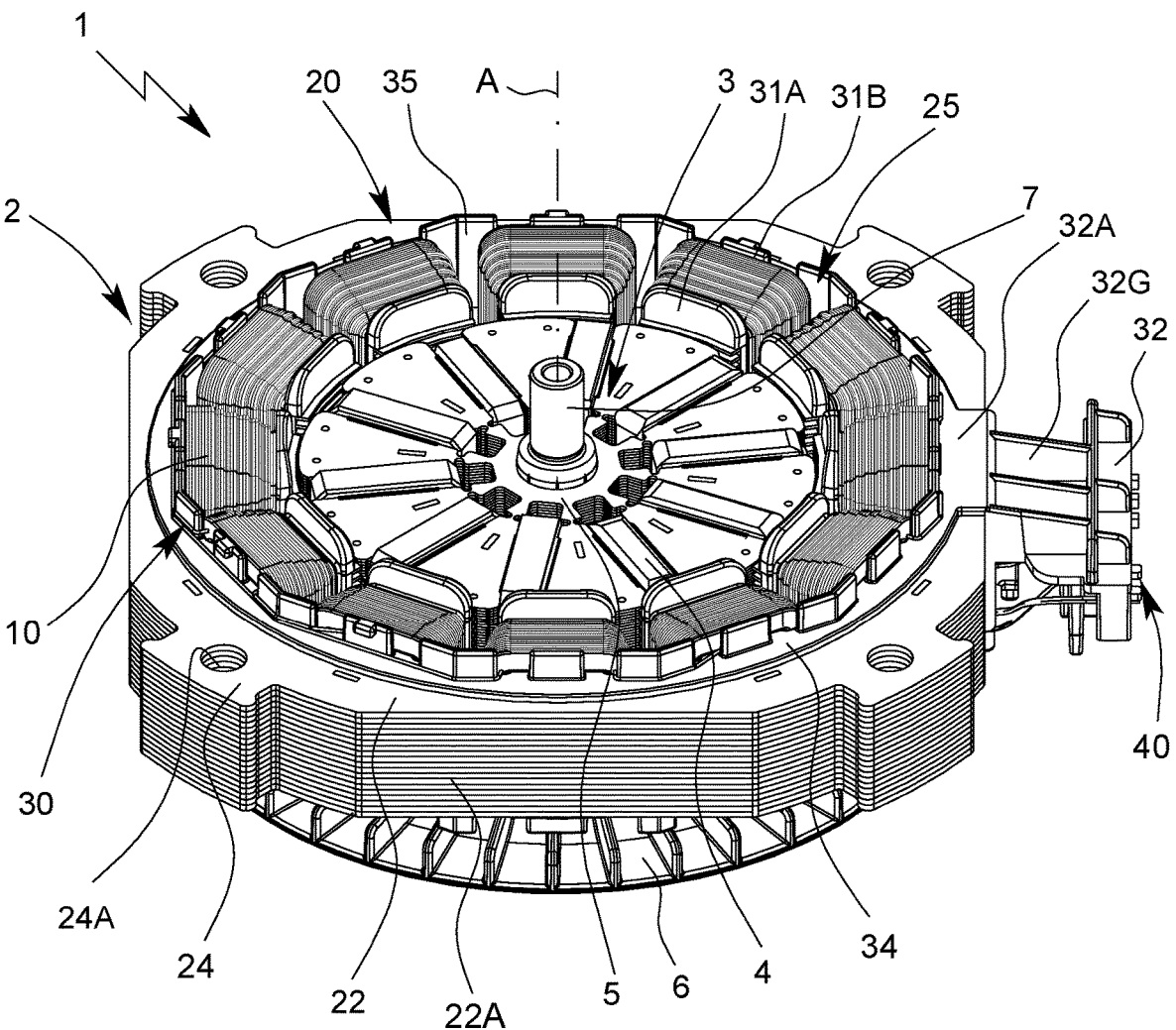
FIG. 1 is a perspective view of a proposed electric motor with a proposed stator and a rotor.

FIG. 1 shows a schematic, perspective view of an electric motor 1 according to the proposal.

In the embodiment shown, the electric motor 1 is designed as a brushless DC motor (BLDC motor). However, other solutions are also possible in principle. In particular, the stator 2 according to the proposal could also be used and be advantageous in a reluctance motor, in particular a switched reluctance motor (SR motor).

The electric motor 1 according to the proposal preferably has a wide (rotational) speed spread and/or can be operated over a wide (rotational) speed range. Preferably, the minimum speed is less than 100, 50 or 20 rpm, in particular less than or equal to 10 rpm, and/or the maximum speed is greater than 2000, 5000 or 8000 rpm, in particular greater than or equal to 10,000 rpm.

The electric motor 1 has a (stationary/fixed) stator 2 and a (rotating/rotatable) rotor 3, the rotor 3 being rotatable about a rotation axis A relative to the stator 2.

As already mentioned at the beginning, terms such as "axial", "radial" and the like preferably refer to the rotation axis A.

Optionally, the electric motor 1 may have a housing and/or stator 2 and/or rotor 3 may be arranged in a housing (not shown).

In the example shown, the electric motor 1 is designed as an internal rotor motor and/or the rotor 3 is arranged at least partially inside the stator 2.

In the example shown in FIG. 1, the rotor 3 preferably has a plurality, here ten, of permanent magnets 4, a rotor core 5, a fan 6, and/or a shaft 7.

The permanent magnets 4 are preferably arranged and/or embedded in the rotor core 5.

The permanent magnets 4 are preferably arranged in a star shape in the rotor 3 or rotor core 5 and/or arranged around the shaft 7 and/or rotation axis A and/or extend or have a main/longitudinal extension—relative to the shaft 7 and/or rotation axis A—in the radial direction.

The permanent magnets 4 are preferably evenly distributed around a circular circumference. Adjacent permanent magnets 4 thus preferably enclose an angle of 360° divided by the number of permanent magnets 4.

In principle, the permanent magnets 4 can also be shaped and/or arranged differently than in the illustrated example, for example with a longitudinal extension in the circumferential direction or perpendicular/tangential to the radial direction.

The rotor core 5 is preferably at least essentially annular, (hollow) cylindrical and/or disk-shaped. The rotation axis A preferably forms an axis of symmetry of the rotor core 5.

The rotor core 5 is fixed/fastened to the shaft 7, in particular connected to the shaft 7 by force-fit, form-fit and/or material-bond.

Preferably, the rotor core 5 comprises or is formed from a plurality of stacked electrical sheets or rotor sheets/rotor laminations.

The fan 6 is preferably fastened/attached to the shaft 7, in particular by a force fit, a form fit and/or a material fit. Additionally or alternatively, the fan 6 may be fastened/attached to the rotor core 5, in particular in a force-fit, form-fit and/or material-fit manner. It is also possible for the fan 6 to be molded to the rotor core 5 and/or the shaft 7.

Preferably, the fan 6 is made of plastic and/or formed in one piece, in particular injection molded.

The fan 6 is preferably disk-like or plate-like and/or at least essentially ring-shaped and/or wheel-shaped and/or rotationally symmetrical. The rotation axis A preferably forms an axis of symmetry of the fan 6.

The fan 6 is designed to transport warm air away from the electric motor 1 (into the environment) and/or to supply cool air (from the environment) to the electric motor 1.

As part of the rotor 3, the fan 6 rotates about the rotation axis A when the electric motor 1 is in operation and can thus convey air accordingly.

The rotor 3 shown and described is only exemplary. In particular, the electric motor 1 can also be designed as a (switched) reluctance motor, as mentioned at the beginning. The rotor 3 is then designed accordingly, for example in the case of a reluctance motor it has no permanent magnets.

Figure 2:
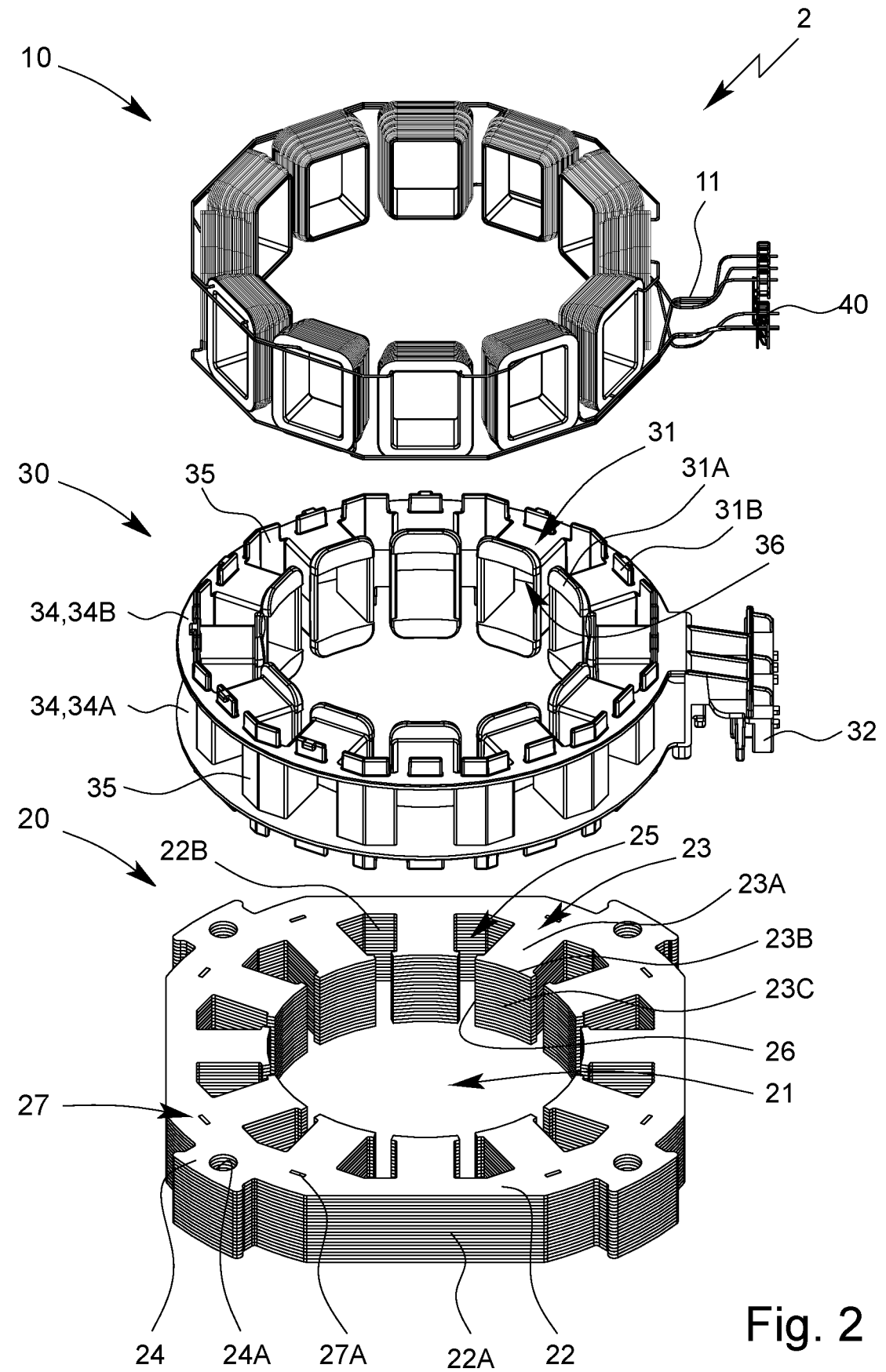
FIG. 2 is an exploded view of the stator according to FIG. 1.

FIG. 2 shows the stator 2 of the electric motor 1 in a schematic exploded view.

The stator 2 has a plurality, here twelve, of windings/coils 10, a stator core 20, a coil carrier 30 and/or a connection device 40.

The stator core 20 preferably comprises a plurality of stacked electrical sheets or stator sheets/stator laminations 27 forming a plurality, here twelve, of stator teeth or coil portions 23, each winding/coil 10 being wound around a coil portion/stator tooth 23 and/or a respective coil portion/stator tooth 23 extending through a coil 10.

In the stator 2 according to the proposal, the coil carrier 30 is provided to support/carry the coils 10, as shown in FIG. 1.

The coil carrier 30 is formed in one piece by injection molding onto the stator core 20.

The coils 10 can preferably be supplied with power via the connection device 40. Preferably, the connection device 40 has one or more electrical connections 41.

The electrical connections 41 are carried by a connection holder 32 which is integral with or forms part of the coil carrier 30.

In the following, a particularly preferred, second embodiment of the stator 2 is described in more detail with reference to FIGS. 3 to 8. The explanations and remarks for the first embodiment also apply to the second embodiment and vice versa, unless explicitly mentioned otherwise and/or unless differences are pointed out.

Figure 3:
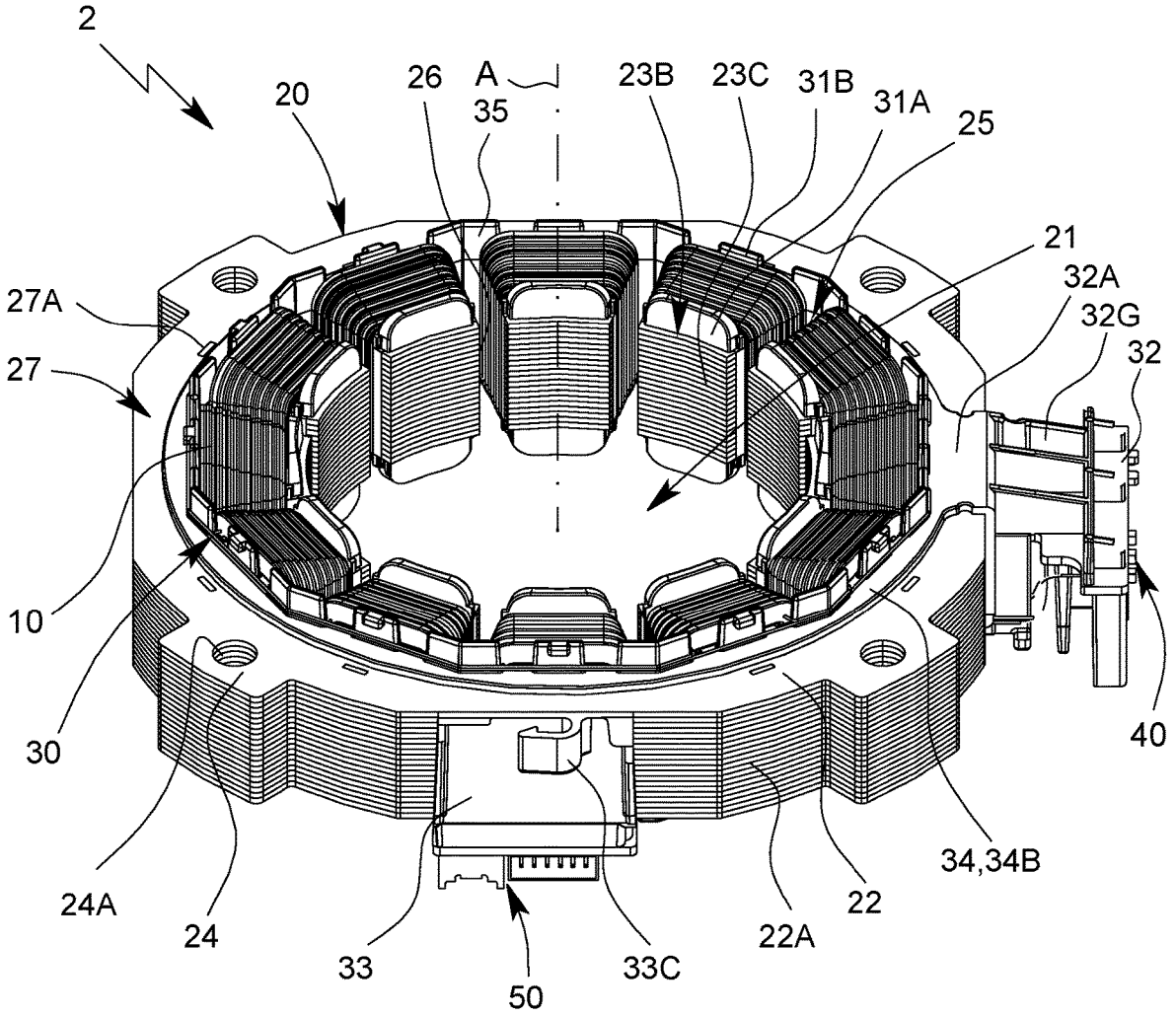
FIG. 3 is a perspective view corresponding to FIG. 1 of a proposed stator according to a second embodiment.
Figure 4:
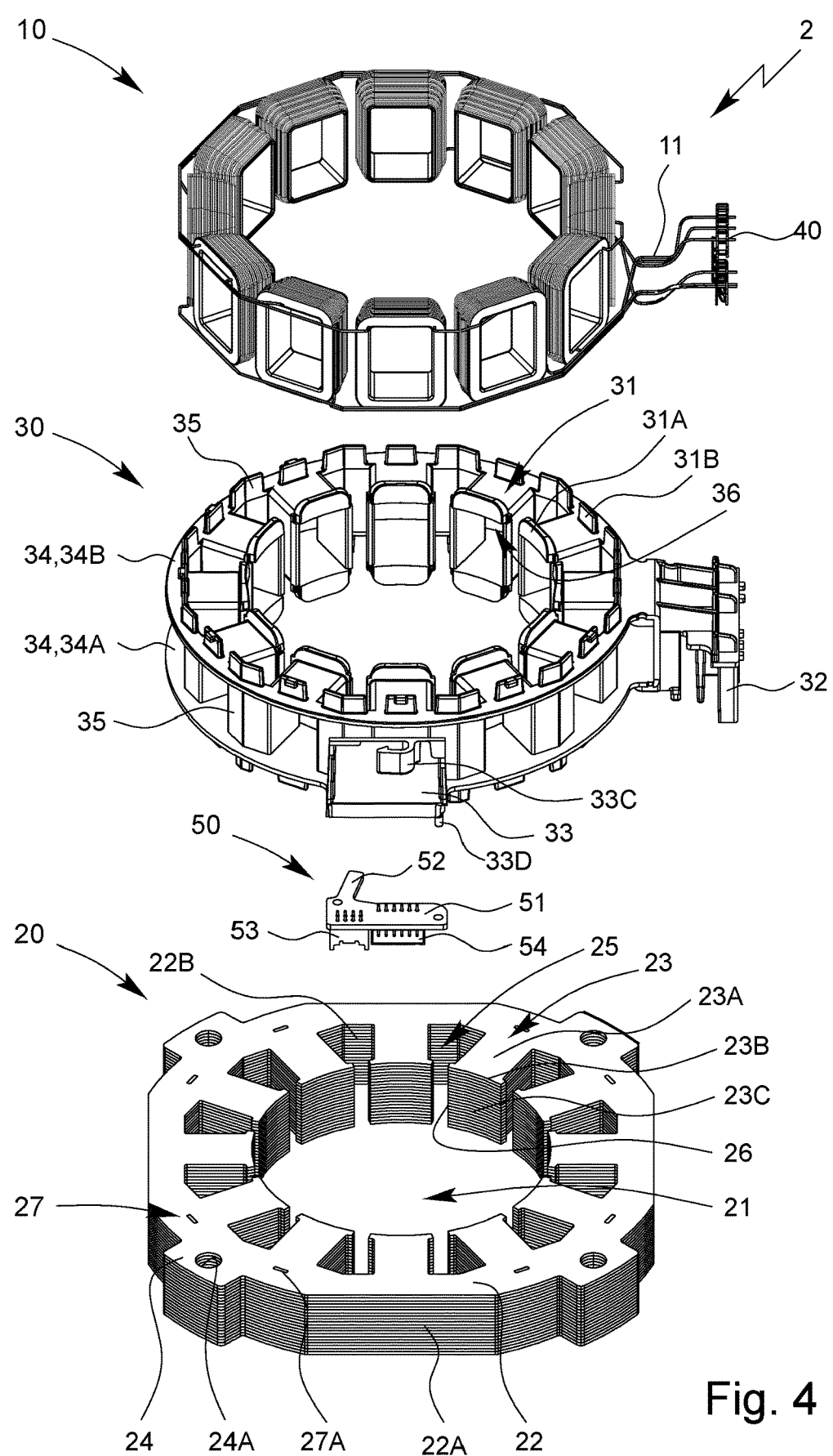
FIG. 4 is an exploded view of the stator according to FIG. 3.
Figure 5:
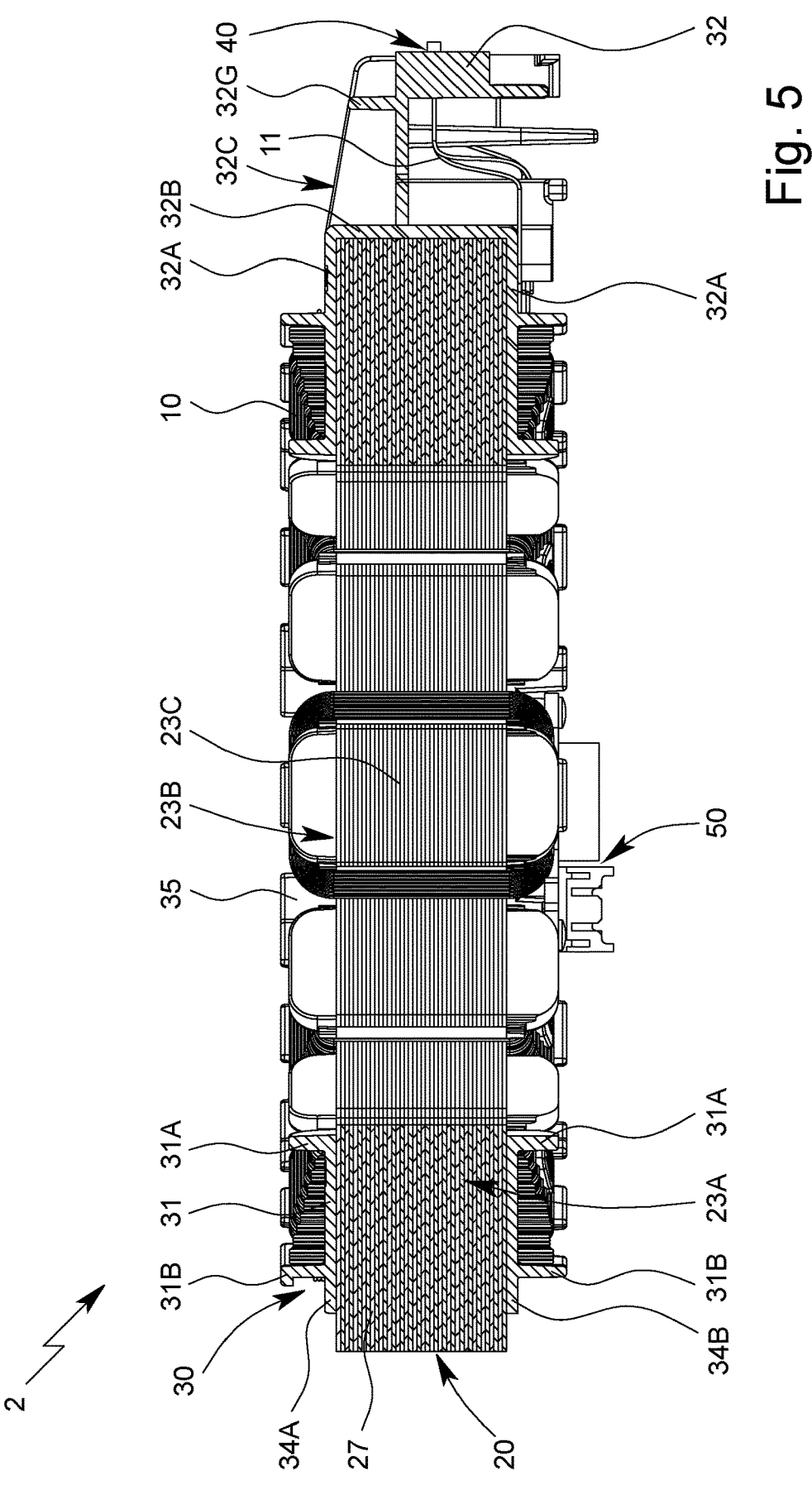
FIG. 5 is a section of the stator according to FIG. 3.

FIG. 3 shows the stator 2 according to the second embodiment in a schematic, perspective view corresponding to the view of the stator 2 according to the first embodiment in FIG. 1. FIG. 4 shows the stator 2 according to the second embodiment in a schematic exploded view corresponding to FIG. 2. FIG. 5 shows a schematic section through the stator 2 according to the second embodiment along a plane in which the rotation axis A lies and which passes through the connection holder 32.

The following description of the stator core 20 preferably applies to both the first and second embodiments or other embodiments having a corresponding stator core 20.

The stator core 20 is preferably at least substantially annular or ring-like. In particular, the stator core 20 has an opening 21 for the rotor 3, which preferably has a cylindrical shape.

The stator 2, stator core 20 and/or opening 21 preferably has an axis of symmetry or ring axis or cylinder axis. This preferably means the axis which runs (centrally) through the opening 21 and/or to which the stator core 20 is arranged concentrically.

Particularly preferably, the stator core 20 is symmetrical with respect to a rotation of 90° about said axis.

The rotation axis A preferably corresponds to the axis of symmetry, ring axis or cylinder axis of the stator 2, stator core 20 and/or opening 21 and/or coincides with it. This is shown in particular in FIG. 1 for the first embodiment, but preferably applies accordingly also to the second embodiment.

Consequently, the stator 2, stator core 20 and/or the opening 21 are/is preferably formed symmetrically to the rotation axis A and/or the rotation axis A runs centrally through the stator 2, stator core 20 and/or the opening 21.

In connection with the stator 2, stator core 20 and/or opening 21, the terms "axial", "radial" and the like can thus preferably also be understood as referring to their axis of symmetry, ring axis or cylinder axis.

In the following, the electric motor 1 and the stator 2 will therefore only be described in connection with the rotation axis A. However, the term "rotation axis A" can also be re-placed in the description by the terms "axis of symmetry", "ring axis" or "cylinder axis", in particular when the stator 2 or its components are described.

The stator core 20 preferably has an at least substantially annular stator yoke 22.

The stator teeth 23 preferably project or extend (radially) inwardly and/or toward the rotation axis A and/or toward the rotor 3 from the stator yoke 22 or an inner side 22B of the stator yoke 22.

The stator core 20 preferably has one or more, in the case of the illustrative example four, projections/protrusions 24 which extend or project (radially) outwards, in particular from the stator yoke 22 or an outer side 22A of the stator core 20 or stator yoke 22.

The terms "outer" and "inner" preferably refer to the rotation axis A, so the outer side 22A is preferably further away from the rotation axis A than the inner side 22B.

In the illustration example according to the first and second embodiments, the outer side 22A of the stator yoke 22 is preferably octagonal and/or the inner side 22B is dodecagonal. Here, the corners/edges formed by the stator yoke 22 with the stator teeth 23 and/or the projections 24 are disregarded.

The outer side 22A preferably forms the outer shell surface/outer lateral area of the stator core 20 and/or stator yoke 22.

Preferably, the outer side 22A has both planar/flat side faces and curved side faces, which are particularly preferably arranged alternately. In the illustrated example of an octagonal outer side 22A, which thus also has eight side faces, preferably four side faces are thus planar/flat and four side faces are curved.

The projections 24 preferably each extend outwardly (centrally) from one of the curved side faces.

In principle, however, other solutions are also possible. For example, all side faces could be planar/flat. Alternatively, the outer side 22A could also be round or have a circular cross-section.

The side faces of the inner side 22B are preferably all planar/flat, but can also be curved as required. Preferably, one stator tooth 23 extends per side face.

By way of example, FIGS. 1 and 2 of the first embodiment and FIGS. 3 and 4 of the second embodiment show differently shaped projections 24. In the second embodiment, the projections 24 have a rectangular shape (in cross-section perpendicular to the rotation axis A). In the first embodiment, the projections 24 have additional extensions at their radially outer end or are approximately T-shaped.

The stator core 20, in particular the projections 24, preferably have screw holes 24A. In particular, each projection 24 has a respective screw hole 24A. The screw holes 24A preferably extend in the axial direction through the stator core 20 and/or the projections 24.

Preferably, the screw holes 24A extend completely through the stator core 20 and/or the projections 24. However, it is also possible that the screw holes 24A extend only to a certain depth into the stator core 20 and/or the projections 24. In this case, corresponding screw holes 24A are preferably formed on both axial end faces or on the upper and lower sides of the stator core 20 and/or the projections 24.

The screw holes 24A are used in particular to fasten/fix/attach bearing bridges 60 to the stator 2 and/or stator core 20. This will be explained in more detail later in connection with FIG. 8. In general, however, the screw holes 24A may also be used for mounting housing parts or the like.

The stator teeth 23 preferably each have an at least substantially cuboid tooth body 23A and/or a tooth head 23B.

The tooth head 23B is arranged at the free end and/or the end facing away from the stator yoke 22 and/or the end facing the opening 21, rotation axis A and/or rotor 3, of the stator tooth 23 or tooth body 23A.

The stator teeth 23, in particular their tooth heads 23B, each preferably have a (concave) curved tooth head face 23C facing the opening 21 and/or the rotation axis A and/or the rotor 3.

The stator teeth 23, in particular the tooth heads 23B and/or their tooth head faces 23C, preferably delimit or define the opening 21 (radially).

A winding space or coil space 25 is preferably formed between two adjacent stator teeth 23, in particular between the tooth bodies 23A. The winding spaces 25 serve in particular to receive/accommodate the coils 10, as shown in FIG. 3.

The winding spaces 25 are preferably each bounded/delimited or defined by two adjacent stator teeth 23, in particular their tooth bodies 23A and/or tooth heads 23B, and the stator yoke 22, in particular its inner side 22B. In particular, the winding spaces 25 are each bounded/delimited in the circumferential direction by two adjacent tooth bodies 23A and/or in the radial direction on the one side by the stator yoke 22 or its inner side 22B and on the other side by two adjacent tooth heads 23B.

The stator 2 and/or stator core 20 preferably has (exactly) twelve winding spaces 25.

Adjacent tooth heads 23B are preferably spaced apart. In particular, a slot 26 is formed between two adjacent tooth heads 23B.

The slot 26 is preferably located between the opening 21 and the respective winding space 25 and/or forms a transition/passage from the opening 21 into the respective winding space 25.

The stator teeth 23 and/or tooth heads 23B, in particular the tooth head faces 23C, preferably form an at least substantially cylindrical, inner lateral (sur)face of the stator core 20. This inner lateral surface is preferably not continuous, but is interrupted respectively by the slots 26.

Preferably, the stator core 20 has a substantially constant thickness or height or axial extent. In particular, the components of the stator core 20, such as the stator yoke 22, the stator teeth 23, and the projections 24, have at least substantially the same axial extent.

The thickness or height or axial extent of the stator core 20, in particular of the lamina-tion/sheet stack of stacked stator sheets 27, is preferably more than 10 mm, in particular more than 15 mm or 18 mm, and/or less than 30 mm, in particular less than 25 mm or 22 mm. Especially preferably, the thickness or height or axial extent of the stator core is about 20 mm.

The inner diameter of the stator core 20 and/or the diameter of the opening 21 is preferably larger than 50 mm or 60 mm, in particular larger than 70 mm, and/or smaller than 100 mm or 90 mm, in particular smaller than 85 mm or 80 mm. Particularly preferably, the inner diameter of the stator core 20 and/or the diameter of the opening 21 is about 77.6 mm.

The inner diameter of the stator core 20 is preferably the distance between two opposing stator teeth 23 or their tooth heads 23B or tooth head faces 23C.

The maximum (outer) diameter of the stator core 20, in particular taking into account the projections 24, in particular the distance from the outer face of one projection 24 to the outer face of the opposite projection 24, is preferably at least 130 mm, in particular at least 140 mm or 150 mm, and/or at most 180 mm, in particular at most 170 mm or 160 mm, particularly preferably about 155 mm.

The (minimum) outer diameter of the stator core 20 and/or stator yoke 22 and/or the distance between two opposite (flat/planar) side faces of the outer side 22A is preferably at least 100 mm, in particular at least 110 mm or 120 mm, and/or at most 150 mm, in particular at most 140 mm, particularly preferably about 130 mm or 131 mm.

The (minimum) yoke thickness of the stator yoke 22, i.e. the (minimum) extension of the stator yoke 22 between its outer side 22A and its inner side 22B, is preferably at least 5 mm, in particular at least 6 mm or 7 mm, and/or at most 15 mm, in particular at most 12 mm, particularly preferably between 9 mm and 10 mm, especially preferably about 9.45 mm.

The radial extent of a stator tooth 23, i.e. the extent from the stator yoke 22 to the tooth head face 23C, is preferably at least 10 mm, in particular at least 15 mm, and/or at most mm, in particular at most 22 mm. Particularly preferably, the radial extent is about 17 mm, especially preferably 17.25 mm.

The radial extent of a tooth head 23B and/or of the slot 26 bounded/delimited by the tooth head 23B is preferably at least 1 mm and/or at most 3 mm, particularly preferably about 2 mm.

Accordingly, the radial extent of the tooth body 23A is particularly preferably 15 mm, especially preferably 15.25 mm.

The tooth body 23A preferably has an at least substantially constant width and/or extent in the circumferential direction. The width of a tooth body 23A preferably corresponds to the distance between two adjacent winding spaces 25.

The width of the tooth body 23A and/or of the stator tooth 23 in the region between the stator yoke 22 and tooth head 23B and/or the distance between two adjacent winding spaces 25 is preferably at least 10 mm, in particular at least 12 mm, and/or at most mm, in particular at most 18 mm. Particularly preferably, the width and/or the distance is about 14 mm.

The width of the tooth head 23B and/or the extent of the tooth head 23B, in particular its tooth head face 23C, in the circumferential direction is preferably greater than the width of the tooth body 23A, in particular by more than 1 mm and/or less than 3 mm. The width of a tooth head 23B preferably corresponds to the distance between two adjacent slots 26.

The distance between two adjacent tooth heads 23B and/or the width of the slot 26 and/or the extent of the slot 26 in the circumferential direction is preferably at least 2 mm and/or at most 6 mm, in particular between 4 mm and 5 mm, particularly preferably about 4.44 mm.

As mentioned at the outset, the stator core 20 preferably comprises or is formed from a plurality of stacked electrical sheets or stator sheets/stator laminations 27. The stator sheets 27 are formed and/or stamped accordingly to form the previously described shape of the stator core 20, in particular the stator yoke 22 and the stator teeth 23.

The shape of an individual stator sheet 27 preferably corresponds to the previously described shape of the stator core 20, with the difference that the stator sheet 27 has only a small axial extension and/or is flat, in particular approximately two-dimensional. The previous and following explanations regarding the shape of the stator core 20 or parts thereof, for example of the stator teeth 23, thus preferably also apply to the stator sheets 27.

Preferably, the thickness/axial extension of a stator sheet 27 is at most 1 mm, in particular at most 0.7 mm and/or at least 0.2 mm, in particular at least 0.4 mm. Particularly preferably, the thickness/axial extension of a stator sheet 27 is about 0.5 mm.

The stator sheets 27 are preferably each formed in one piece, in particular stamped/punched out or cut out as one piece from an (electrical sheet) blank.

The stator sheets 27 can have connecting areas or punch areas 27A for connecting the individual stator sheets 27. These are preferably elevations or depressions in the respective stator sheets 27, which ensure a defined cohesion of the stator sheets 27.

Preferably, the punch areas 27A are provided (exclusively) on the stator yoke 22 and/or are respectively arranged on the left and right or adjacent to a screw hole 24A and/or are respectively arranged centrally to a stator tooth 23.

In the illustrative example, each stator sheet 27 preferably has eight punch areas 27A. In particular, in the illustrative example, there are four stator teeth 23 without an associated punch area 27A.

The punch areas 27A are preferably point-shaped and/or line-shaped.

Preferably, the stator sheets 27 are or have been compressed/compacted with a force greater than 30 kN, 40 kN or 50 kN, and/or less than 80 kN or 70 kN, particularly preferably with a force of about 60 kN, to form the stator core 20.

The stator core 20 preferably consists of or comprises at least 30, in particular at least and/or preferably at most 50, in particular at most 45 stator sheets 27. Particularly preferably, the stator core 20 consists of or comprises about 40 stator sheets 27.

The number of stator sheets 27 can be variable. In particular, the thickness of the stator core 20 can be varied depending on the number of stator sheets 27 and/or, if the thickness of the stator core 20 is predetermined, a thickness tolerance in the individual stator sheets 27 can be compensated.

Particularly preferably, the number of stator sheets 27 can vary by more than one sheet and/or by less than fifteen sheets, in particular by at most ten sheets. The number of stator sheets 27 is particularly preferably 40±5 sheets.

As explained previously, the stator core 20, and thus also each stator sheet 27, is preferably symmetrical with respect to a rotation of 90° about the rotation axis A. This rotational symmetry results in particular from the four projections 24.

When manufacturing the stator core 20, the stator sheets 27 are preferably placed on top of each other, each rotated by 90°. This preferably compensates for height inaccuracies of the stator sheets 27.

Usually, the stator sheets 27 are rolled and/or are cut or stamped from rolled electrical steel. In the case of a rolled electrical sheet, small grooves normally appear in the rolling direction. In the case of a stator 2 whose stator sheets 27 are rotated by 90° during stacking, the direction of the grooves also changes by 90° as a result. This manufacturing process can therefore also be seen on the finished end product.

The coil carrier 30 preferably has a plurality of coil retainers/winding portions 31 for the coils 10 and at least one holder/mount 32, 33 for a connection device 40 and/or a sensor device 50.

In the illustration example according to the first embodiment, as shown in FIG. 1 and FIG. 2, the coil carrier 30 preferably has only one connection holder 32 for a connection device 40, while in the illustration example according to the second embodiment, as shown in FIGS. 3 to 6 and 8, both a connection holder 32 for a connection device 40 and a sensor holder 33 for a sensor device 50 are provided. In principle, however, other solutions are also possible, for example a single holder for connection device 40 and sensor device 50 or more than two holders 32, 33, for example to hold multiple sensors by means of multiple (sensor) holders. The holders 32, 33 and the devices 40, 50 held by them will be discussed in more detail later with reference to FIGS. 6 to 8.

The following description of the coil carrier 30 with reference to FIGS. 1 to 5 preferably applies to both the first and second embodiments or other corresponding embodiments having more or fewer holders.

The coil carrier 30 is formed in one piece, namely by injection molding (on)to or around the stator core 20.

Preferably, the coil carrier 30 is made of plastic and/or consists of plastic, in particular polyamide, especially preferably polyamide of the PA6 type.

Preferably, the coil carrier 30 engages around, surrounds, or encloses/encases the stator core 20, at least partially. Particularly preferably, the coil carrier 30 or its winding portions 31 completely surrounds or encloses/encases the tooth bodies 23A of the stator teeth 23.

The coil carrier 30 is preferably held on the stator core 20 positively/in a form-fit manner, in particular in all spatial directions or in the axial direction, radial direction and circumferential direction. The form fit is preferably implemented in such a way that the coil carrier 30 is held immovably (in all spatial directions) on the stator core 20.

The coil carrier 30 preferably lies directly against the stator core 20, in particular without air gaps or the like, as shown by way of example in the sectional view according to FIG. 5.

Particularly preferably, the coil carrier 30 is materially and/or adhesively bonded to the stator core 20. This is realized in particular by injection molding on/around the stator core 20, in which the plastic preferably adheres to the stator core 20. Additionally, an adhesion agent can be added to the plastic, which reinforces the adhesion to the stator core 20 or makes it possible in the first place.

The wall thickness of the coil carrier 30 is preferably greater than 1 mm and/or less than 3 mm, in particular less than 2 mm. In particular, the wall thickness of the coil carrier 30 is less than that of solutions known from the prior art, such as a two-piece coil carrier that is plugged onto the stator core.

The coil carrier 30 preferably has one winding portion 31 per stator tooth 23, twelve winding portions 31 in the example shown. The winding portions 31 preferably extend from an at least substantially circular collar 34 (radially) inwards and/or in the direction of the rotation axis A and/or of the rotor 3 and/or along the stator teeth 23, in particular the tooth bodies 23A.

In the illustrative example, the coil carrier 30 preferably has two collars 34, namely a first collar 34A and a second collar 34B.

The collars 34A, 34B preferably lie (directly) against and/or are injection molded onto the stator core 20, in particular the stator yoke 22. The first collar 34A preferably lies (directly) against a first axial end face or upper side of the stator core 20, in particular the stator yoke 22, and the second collar 34B lies (directly) against the opposite axial end face or lower side of the stator core 20, in particular the stator yoke 22.

Preferably, the stator core 20 is axially fixed and/or an axial positive fit is formed between the first collar 34A and the second collar 34B.

Preferably, the coil carrier 30 is fixed and/or positively connected to the stator core 20 in the axial direction by the collars 34A, 34B. In particular, the collars 34A, 34B each lie against the axial end faces of the stator core 20 and thus prevent any or all movement of the coil carrier 30 relative to the stator core 20 in the axial direction.

Particularly preferably, the first collar 34A and/or the second collar 34B are materially and/or adhesively bonded to the stator core 20 and/or stator yoke 22.

The collars 34A and/or 34B preferably cover the stator yoke 22 only partially or not completely.

A connecting wall 35 preferably extends between the first and second collars 34A, 34B and/or between two adjacent winding portions 31 (in each case). In particular, the respective connecting wall 35 extends in the axial direction between the two collars 34A, 34B and/or in the circumferential direction between the two adjacent winding portions 31.

Preferably, the connecting walls 35 each lie (directly) against and/or are injection molded onto the stator core 20, in particular the inner side 22B of the stator yoke 22. Particularly preferably, the connecting walls 35 are materially and/or adhesively bonded to the stator core 20, in particular to the inner side 22B of the stator yoke 22.

Preferably, the coil carrier 30 is fixed and/or positively connected to the stator core 20 in radial direction by the connecting walls 35. In particular, the connecting walls 35 lie against and along the inner side 22B and/or the circumference of the stator yoke 22 and thus prevent any or all movement of the coil carrier 30 relative to the stator core 20 in the radial direction.

The connecting walls 35 may extend axially beyond the respective collars 34A, 34B, for example to form guide projections for guiding coil wire 11 or the like.

The winding portions 31 are preferably each at least substantially (hollow) cuboidal in shape. In particular, the winding portions 31 each have and/or delimit a window or through opening/passage opening 36 through which a respective stator tooth 23 extends.

The respective winding portion 31 preferably completely surrounds, encases, or covers the tooth body 23A. In particular, the respective winding portion 31 covers the tooth body 23A axially (from both sides) and on the respective side faces of the tooth body 23A facing the winding spaces 25.

The winding portions 31 preferably each lie (directly) against and/or are injection molded onto the stator core 20, in particular the respective stator teeth 23 or tooth bodies 23A. Particularly preferably, the winding portions 31 are materially and/or adhesively bonded to the stator core 20, in particular to the respective stator teeth 31 or tooth bodies 23A.

Preferably, the coil carrier 30 is fixed and/or positively connected to the stator core 20 in the axial direction and/or in the circumferential direction by the winding portions 31. In particular, the winding portions 31 lie against and along the stator teeth 23 and/or tooth bodies 23A and thus prevent any or all movement of the coil carrier 30 relative to the stator core 20 in the axial direction and/or in the circumferential direction.

The tooth heads 23B and/or their tooth head faces 23C preferably protrude from the respective winding portions 31 and/or the through openings 36 in the radial direction. In particular, the tooth heads 23B and/or tooth head faces 23C are exposed or uncovered.

The coil carrier 30 and/or the winding portions 31 preferably have a plurality of winding projections 31A, 31B, which extend in particular in the axial direction. The winding projections 31A, 31B preferably serve as radial boundary/delimitation for the coils 10.

In the illustrative example, each winding portion 31 has a first winding projection 31A and a second winding projection 31B. The first winding projection 31A preferably extends at the free end of the winding portion 31 and/or the second winding projection 31B extends at the opposite end and/or between the winding portion 31 and the respective collar 34A, 34B. Preferably, each winding portion 31 has a first and a second winding projection 31A, 31B on each axial side, thus preferably a total of four winding projections 31A, 31B.

The coils 10 are preferably each held (radially) between two winding projections 31A, 31B.

The coils 10 are preferably each formed by coil wire 11 wound around the respective winding portions 31.

The stator teeth 23 preferably extend through the coils 10 and/or are (indirectly) wound around by the coils 10, wherein the coil carrier 30 or its winding portions 31 are located between the stator teeth 23 and the coils 10.

Each coil 10 preferably has at least 140, in particular at least 150 turns and/or at most 200, in particular at most 190 turns, particularly preferably about 170 turns. Accordingly, each stator tooth 23 and/or tooth body 23A is preferably wound around at least 140 times, in particular at least 150 times and/or at most 200 times, in particular at most 190 times, particularly preferably about 170 times.

The coil wire 11 from which the coils 10 are formed and/or wound is preferably made of copper.

The coil wire 11 preferably has a bare wire diameter of at least 0.2 mm and/or at most mm, particularly preferably of about 0.4 mm.

The coil wire 11 preferably has a total weight of more than 100 g, in particular more than 150 g, and/or less than 300 g, in particular less than 250 g, particularly preferably of about 200 g.

In the illustration example according to the first and second embodiments, preferably four coils 10 each are wound from the same coil wire 11, in particular two adjacent coils and their respective opposite coils 10. The twelve coils 10 of the illustration example can thus preferably be divided into three groups, which in particular can be con-trolled/activated/driven separately. It is preferably a three-phase electric motor 1. In general, however, other solutions are also possible.

In the following, the holders 32, 33 are described in more detail, in particular with reference to FIG. 6 to FIG. 8. The explanations and remarks regarding the connection holder 32 preferably apply to the first and second embodiments.

Figure 6:
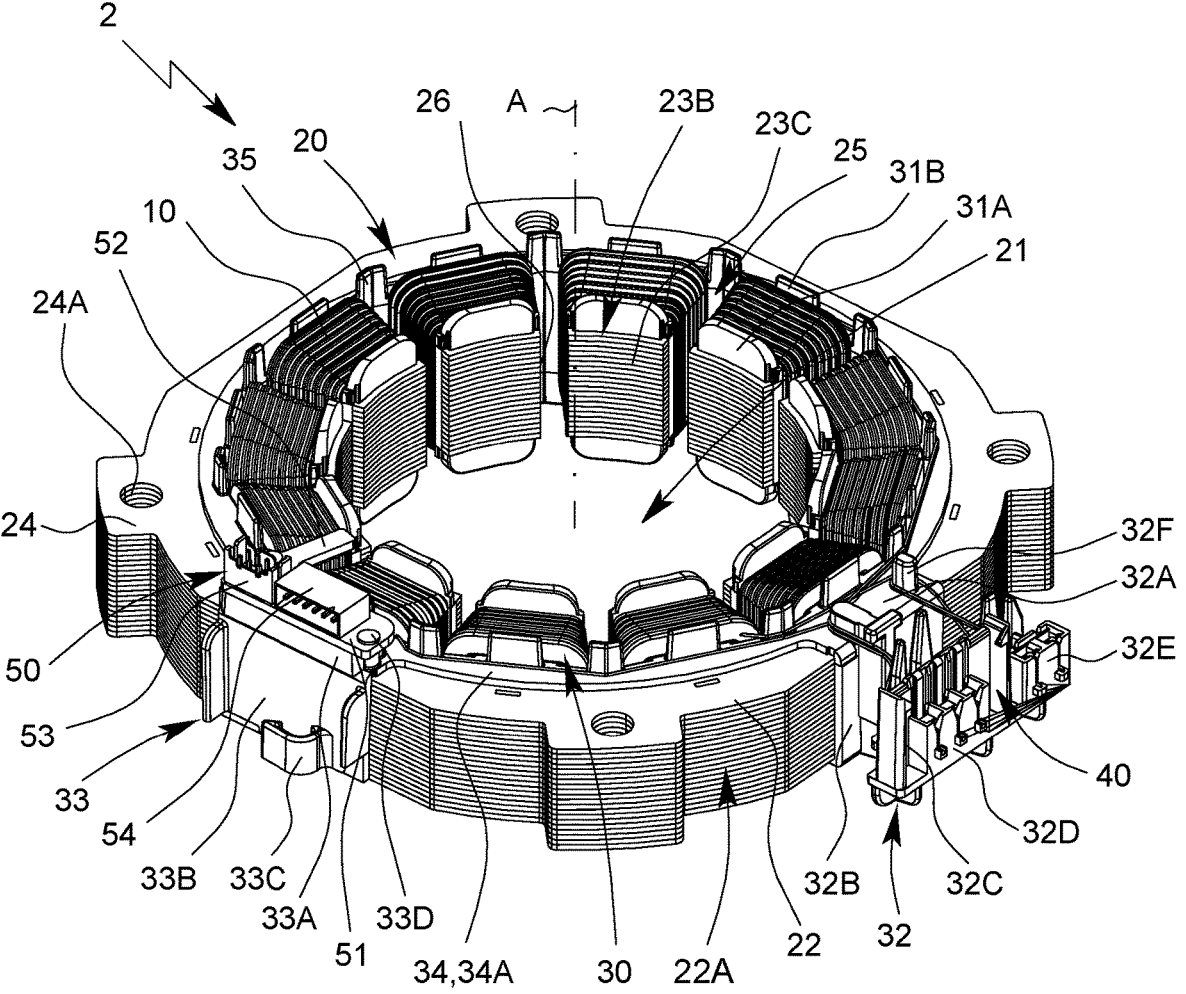
FIG. 6 is a further perspective view of the proposed stator according to the second embodiment.

FIG. 6 shows the stator 2 according to the second embodiment in a schematic, perspective view. Compared with the perspective view according to FIG. 3, the stator 2 in FIG. 6 is rotated by 45° about the rotation axis A and shown from the other axial end face. In particular, FIG. 3 shows a perspective view of one axial end face of the stator core 40 against which the second collar 34B lies, and FIG. 6 shows the other axial end face of the stator core 40 against which the first collar 34A lies.

As already mentioned at the outset, the coil carrier 30 preferably has one or more holders, in the second embodiment preferably a connection holder 32 and a sensor holder 33. In general, however, other and/or more than two holders are also conceivable.

Generally, the holder(s), in particular the connection holder 32 and/or sensor holder 33, is/are arranged radially on the outside of the stator core 40 and/or on the outer side 22A of the stator core 20 and/or stator yoke 22 and/or on a side of the stator core 20 facing away from the rotor 3, opening 21 and/or coils 10. Particularly preferably, the holder(s), in particular the connection holder 32 and/or sensor holder 33, is/are (each) arranged on one of the flat/planar side faces of the outer side 22A. Multiple holders may also be arranged on the same side face.

The holder(s), in particular the connection holder 32 and/or sensor holder 33, is/are preferably formed integrally with the coil carrier 30 and/or forms/form (respectively) a part or portion of the integral coil carrier 30. In principle, however, the holder(s) form an independent aspect of the invention and may therefore also be manufactured separately and connected to the coil carrier 30.

Preferably, the holder(s), in particular the connection holder 32 and/or the sensor holder 33, is/are injection molded onto the stator core 40.

The holder(s), in particular the connection holder 32 and/or the sensor holder 33, preferably lies/lie (directly) against and/or are injection molded onto the stator core 20, in particular the stator yoke 22 and/or the outer side 22A. Particularly preferably, the holder(s), in particular the connection holder 32 and/or the sensor holder 33, is/are materially and/or adhesively bonded to the stator core 20, in particular the stator yoke 22 and/or the outer side 22A.

Preferably, the holder(s), in particular the connection holder 32 and/or the sensor holder 33, is/are formed on the collar 34A and/or 34B and/or extend(s) radially outward from the collar 34A and/or 34B.

The holder(s) preferably have at least one radial portion 32A, 33A and one axial portion 32B, 33B.

The radial portion 32A, 33A preferably extends radially outwardly and/or toward the outer side 22A along one of the axial end faces of the stator core 20 or stator yoke 22, in particular from the collar 34A and/or 34B.

The respective holder may have only one radial portion 32A, 33A at one of the end faces or one radial portion at each of the two end faces. In the illustrative example, the connection holder 32 preferably has two radial portions 32A, one radial portion 32A extending from the first collar 34A and a further radial portion 32A extending from the second collar 34B. In the illustrative example, the sensor holder 33 preferably has only one radial portion 33A extending from the first collar 34A. However, other solutions are also possible here.

The (respective) radial portion 32A, 33A preferably lies (directly) against and/or is injection molded onto the stator core 20, in particular the stator yoke 22. Particularly preferably, the (respective) radial portion 32A, 33A is materially and/or adhesively bonded to the stator core 20, in particular the stator yoke 22.

The axial portion 32B, 33B preferably extends along the outer side 22A of the stator core 20 and/or stator yoke 22.

The axial portion 32B, 33B preferably lies (directly) against and/or is injection molded onto the stator core 20 and/or stator yoke 22, in particular the outer side 22A. Particularly preferably, the axial portion 32B, 33B is materially and/or adhesively bonded to the stator core 20 and/or stator yoke 22, in particular the outer side 22A.

The axial portion 32B, 33B and the radial portion(s) 32A, 33A preferably extend at least substantially perpendicular to each other.

Preferably, the (respective) holder, in particular the connection holder 32 and/or the sensor holder 33, engages around the stator core 20 and/or the stator yoke 22, in particular with its axial portion 32B, 33B and radial portion(s) 32A, 33A.

The holder(s), in particular the connection holder 32 and/or sensor holder 33, preferably extend(s) over the entire height and/or axial extent of the stator core 20, stator yoke 22 and/or outer side 22A, in particular with the axial portion 32B, 33B.

Depending on the holder, the width of the holder, i.e. its extension in the circumferential and/or tangential direction and/or (directly/abuttingly) along the outer side 22A in the direction perpendicular to the axial direction can vary. In the illustrative example, the connection holder 32, in particular its axial portion 32B, extends less far (directly and/or abuttingly) along the outer side 22A than the sensor holder 33, in particular its axial portion 33B, preferably by about 5 mm less. The same preferably applies to the extension of the holders 32, 33 along the axial end face of the sensor core 20 (in the tangential direction), in particular the radial portions 32A, 33A.

Preferably, the corresponding width/extension of the connection holder 32, in particular of the radial and/or axial portion 32A, 32B, is more than 20 mm and/or less than mm, and/or the corresponding width/extension of the sensor holder 33, in particular the radial and/or axial portion 33A, 33B, is more than 25 mm and/or less than 35 mm. However, the connection holder 32 may have a wider protruding portion 32C that is not in direct contact with the sensor core 20, as described in further detail below.

The contact surface of the connection holder 32, in particular of the axial portion 32A, against the outer side 22A is preferably more than 400 mm2 and/or less than 600 mm2. The contact surface of the sensor holder 33, in particular of the axial portion 33A, against the outer side 22A is preferably more than 500 mm2 and/or less than 700 mm2. Particularly preferably, the contact surface of the sensor holder 33 is larger than the contact surface of the connection holder 32 by at least 100 mm2.

The connection device 40 and the sensor device 50 are preferably arranged offset by 90° on the sensor core 20 and/or the outer side 22A. However, other solutions are also conceivable, for example, the connection device 40 and the sensor device 50 could be opposite each other.

In the following, the connection holder 32 and the connection device 40 held by it are explained in more detail, in particular with reference to FIGS. 6 and 7. The explanations preferably apply to both the first and second embodiments.

The connection holder 32 holds/carries the connection device 40 or is configured for this purpose.

Preferably, the connection holder 32 has, in particular in addition to the radial portion 32A and axial portion 32B, a protruding portion 32C that holds or is configured to hold the connection device 40.

The portion 32C preferably extends radially outwardly from the radial portion 32A and/or axial portion 32B. In particular, the portion 32C is spaced from and/or not directly connected to the stator core 20.

The portion 32C is preferably shaped like a balcony.

The width/extension in the tangential direction of the portion 32C is preferably greater than the corresponding width/extension of the radial portion 32A and/or axial portion 32B, in particular by more than 10 mm or 15 mm and/or less than 25 mm.

In general, solutions without portion 32C are also possible, in which the connection device 40 is preferably held directly by the radial and/or axial portion 32A, 32B.

Figure 7:
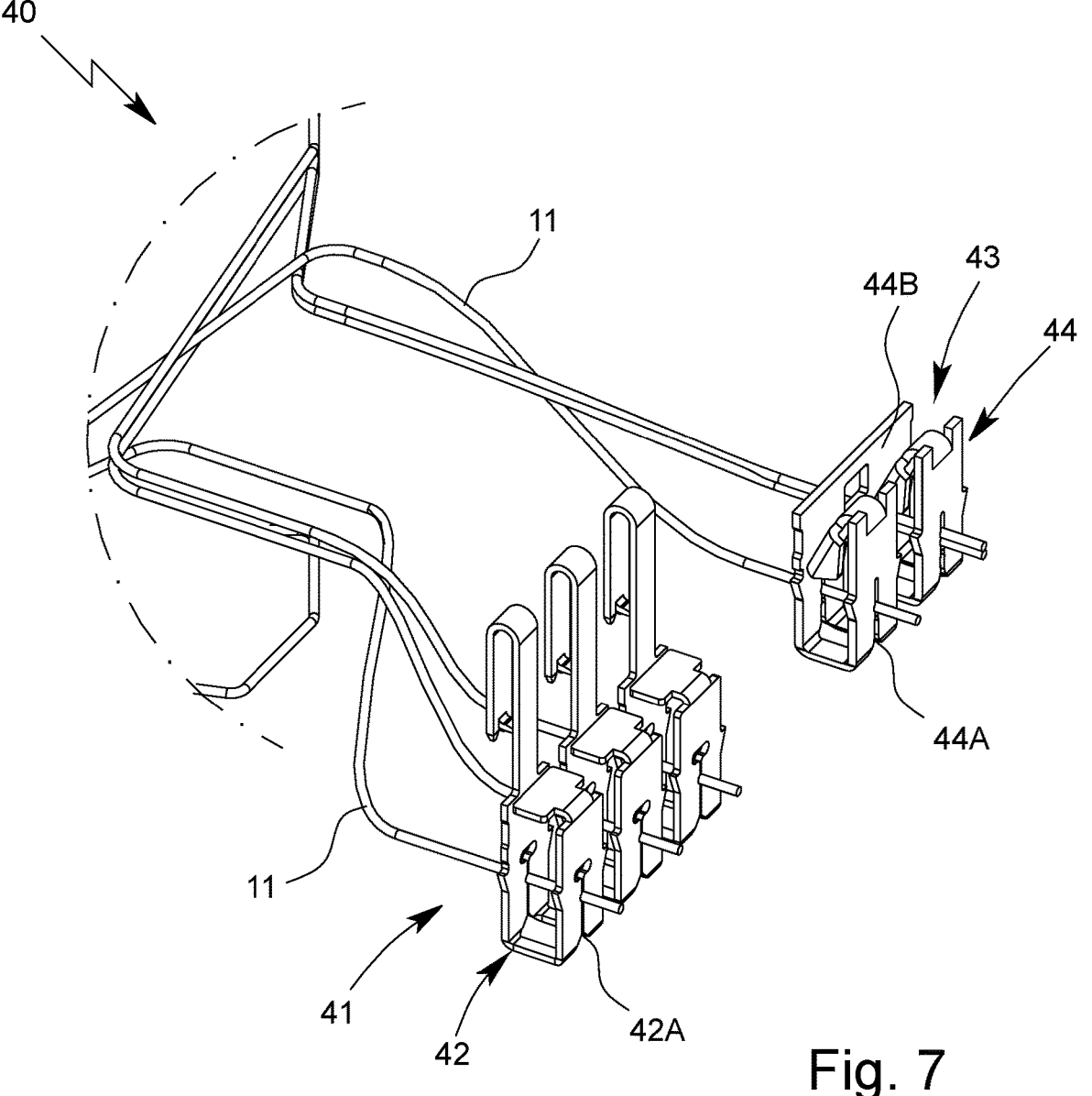
FIG. 7 is a perspective view of connection contacts of the proposed stator.

FIG. 7 shows a schematic perspective view of the connection device 40. The illustration here corresponds to an enlargement of FIG. 6, wherein the connection holder 32 is not shown.

The connection device 40 preferably has an electrical connection and/or electrical connection contacts 41.

The coils 10 can preferably be supplied with current and/or control signals via the electrical connection contacts 41, in particular via the ends of the coil wires 11.

The electrical connection contacts 41 are preferably formed by or have one or more terminals 42, in particular insulation displacement terminals. The terminal(s) 42 preferably have (each) a terminal slot 42A for conductive connection to a coil wire 11 or its end.

The terminals 42 are preferably spaced apart from each other and/or held correspondingly spaced apart by the connection holder 32 so that they are electrically insulated from each other.

A different voltage can preferably be applied to each contact 41 and/or each terminal 42, in particular so that the various coil wires 11 and associated coils 10 can be controlled/activated/driven differently.

The number of contacts 41 and/or terminals 42 may vary depending on the number of different coil wires 11 and/or depending on the interconnection of the coil wires 11 and/or the coils 10. In the illustrative example, the connection device 40 preferably has three electrical connection contacts 41 and/or terminals 42.

Preferably, the connection device 40 has a star point 43 of the interconnection of the coil wires 11 and/or the coils 10. In particular, the coils 10 are interconnected in a star connection. This preferably means that the different coil wires 11 of the different (groups of) coils 10 are connected to each other, in particular at ends of the coil wires 11.

Preferably, each coil wire 11 with its one end forms an electrical connection contact 41 and/or is electrically connected to a corresponding terminal 42 and with its other end is connected to the star point 43.

In the example shown, three (ends of the) coil wires 11 are preferably interconnected to form a star point.

The connection device 40 preferably has, in particular in addition to the terminal(s) 42 for the connection contacts 41, a terminal 44, in particular an insulation displacement terminal, for forming the star point 43.

The terminal 44 is preferably designed to electrically connect the (ends of the) coil wires 11 to each other and/or to form the star point 43.

Preferably, the terminal 44 has one or more terminal slots 44A for conductive connection to one or more coil wires 11. For example, the terminal 44 could have one terminal slot 44A electrically connecting all, in particular three, coil wires 11. Alternatively, the terminal 44 may have multiple terminal slots 44A. In this case, the terminal 44 preferably has a contact bridge 44B that electrically connects the terminal slots 44A and thus the (ends of the) coil wires 11 pinched there.

In the illustrative example, the terminal 44 has two terminal slots 44A which are connected to each other by a contact bridge 44B. Since the electric motor 1 or stator 2 has three different coil wires 11/three ends of the coil wires 11 which are to be connected together to form a star point 43, two coil wires 11 are pinched in the same terminal slot 44A. The terminal 44 shown is preferred because it is a standard terminal. However, it is also possible to use a terminal 44 with three terminal slots 44A or only one terminal slot 44A.

As an alternative to the terminal 44, the star point 43 can also be formed by soldering or welding or otherwise electrically connecting the corresponding ends of the coil wires 11 to each other.

Preferably, the connection holder 32, in particular the protruding portion 32C, has a contact portion 32D which holds/carries the electrical connection contacts 41 and/or terminals 42, and/or has a star point portion 32E which holds/carries the star point 43 and/or terminal 43.

The connection contacts 41 and/or the star point 43 are held and/or arranged by means of the connection holder 32 radially on the outside of the stator 2 and/or stator core 20, in particular the side of the stator 2 and/or stator core 20 facing away from the coils 10.

Preferably, the connection device 40 and/or the connection contacts 41 and/or the star point 43 and/or the terminal(s) 42 and/or 44 can be or are mounted on the connection holder 32 in an automated manner. Particularly preferably, the connection contacts 41/terminals 42 and the star point 43/terminal 44 can be mounted on the connection holder 32 in an automated manner by means of the same device.

In general, it is also possible to provide two holders, wherein one holder holds the connection contacts 41 and a further holder holds the star point 43. Furthermore, it is also possible to provide only the connection contacts 41 on the connection holder 32, for example if no star connection is provided.

The connection holder 32 may have one or more guide projections 32F around which the coil wire 11 can be wound and/or by means of which the coil wire 11 can be guided, in particular to the connection device 40. The guide projections 32F may extend, for example, in the axial direction from the radial portion 32A.

The connection holder 32 may have one or more ribs 32G, preferably to reinforce the connection holder 32, in particular the protruding portion 32C. Preferably, by means of the ribs 32G, the connection holder 32, in particular the protruding portion 32C, is pre-vented from elastically bending.

The sensor holder 33 holds/carries the sensor device 50 or is configured for this purpose.

The sensor device 50 preferably has a sensor plate 51, a sensor 52, an electrical connection 53 and/or a sensor connection 54.

The electrical connection 53 is preferably a connection and/or contact via which the sensor device 50 can be supplied with power and/or via which electrical signals from the sensor device 50 and/or the sensor 52 can be tapped and/or forwarded to an evaluation unit (not shown).

The sensor connection 54 is preferably a connection and/or contact via which the sensor 52 or further sensor 55 can be connected, in particular by means of a sensor cable 56, to the sensor device 50, in particular the sensor plate 51. This will be explained in more detail later in connection with FIG. 8.

The sensor plate 51 is preferably a (printed) circuit board and/or designed to process and/or transmit electrical signals. However, it is also possible that the sensor plate 51 is merely a (non-conductive) mounting plate that carries a sensor 52 and/or a connection 53, 54 for a sensor.

Preferably, the sensor plate 51 carries or forms the sensor 52, electrical connection 53 and/or sensor connection 54.

The sensor device 50 or parts thereof, in particular the sensor plate 51, the sensor 52, the electrical connection 53 and/or the sensor connection 54, is/are preferably held by and/or fixed/fastened to the sensor holder 33.

Particularly preferably, the sensor device 50, in particular the sensor 52 and/or the sensor plate 51, is fixed/fastened on the axial portion 33B of the sensor holder 33.

The sensor holder 33 preferably has one or more fastening portions 33D, by means of which the sensor device 50, in particular the sensor 52 and/or the sensor plate 51, is or can be fastened to the sensor holder 33, preferably in a form-fitting and/or material-fitting manner.

In the illustration example, the fastening portion 33D is designed as a pin or stud that is or has been heat staked to the sensor device 50, in particular to the sensor plate 51, for fastening the sensor device 50. FIG. 4 exemplarily shows the fastening portion 33D before heat staking, while the fastening portion 33D is shown in FIG. 6 after heat staking. Preferably, the sensor holder 33 has at least two such fastening portions 33D.

However, other solutions are also conceivable, for example screwing or gluing the sensor device 50 and/or sensor plate 51 to the sensor holder 33.

Preferably, the sensor holder 33 comprises a cable retainer 33C configured to hold, fix and/or guide one or more cables 56 of the sensor device 50. In particular, the cable(s) 56 may be a cable that is or can be connected to the electrical connection 53 and/or the sensor connection 54.

The cable retainer 33C is preferably formed on the axial portion 33B of the sensor holder 33 and/or projects radially outward from the axial portion 33B and/or the sensor core 20 and/or the outer side 22.

Preferably, the cable retainer 33C is hook-shaped or designed as a hook.

The cable retainer 33C may be partially resilient, in particular such that the cable(s) 56 may be clipped into the cable retainer 33C.

The sensor device 50 and/or the sensor 52 is preferably configured to measure variables of the coils 10 and/or the rotor 3. Accordingly, the sensor 52 is preferably arranged in the region of the coils 10 and/or the rotor 3.

In the illustration example, the sensor 52 is preferably designed to detect measurement variables of the coils 10. Accordingly, the sensor 52 preferably extends over the coils 10 and/or is arranged axially above the coils 10. In particular, the sensor device 50 and/or sensor plate 51 and/or sensor 52 has an arm or arm-like portion which extends (from the sensor holder 33) in a radial direction towards the rotation axis A and/or which projects above one of the coils 10. In the case of a measurement of rotor properties, the sensor device 50 and/or the arm preferably extends beyond the coils 10 to above the rotor 3.

In the illustrative example, the sensor 52 is preferably designed to measure the temperature of the electric motor 1, in particular in the region of the coils 10, and/or as a temperature sensor 52. Particularly preferably, the sensor 52 is an NTC temperature sensor. Preferably, the sensor 52 measures the air temperature in the region in which it is arranged.

Alternatively, the sensor 52 can be designed to detect the angle of rotation of the rotor 3 and/or as an angle of rotation sensor. This can be realized, for example, by a light barrier and/or by a Hall sensor and/or a Hall switch element, which preferably determines the rotor polarity, from which the rotational speed of the rotor 3 can be calculated.

The sensor 52 can also be designed as a Hall sensor for determining other, in particular magnetic, measurement variables of the electric motor 1.

Generally, the sensor 52 is not limited to a temperature sensor, Hall sensor, and/or angle of rotation sensor, but may be any other sensor.

It is also possible for the sensor device 50 to comprise multiple sensors 52 and/or for multiple sensors 52 to be held by or fastened to the sensor holder 33. Alternatively or additionally, the coil carrier 30 may comprise a plurality of sensor holders 33, each sensor holder 33 holding/carrying one or more sensors.

Generally, it is also possible that only one holder is provided that holds/carries both the connection device 40 and the sensor device 50.

As previously mentioned, the sensor of the sensor device 50 need not be directly or immediately fastened to the sensor holder 33. It is also possible that the sensor holder 33 only directly holds/carries the sensor connection 54, to which a sensor is connected or connectable. This is shown schematically in FIG. 8.

Figure 8:
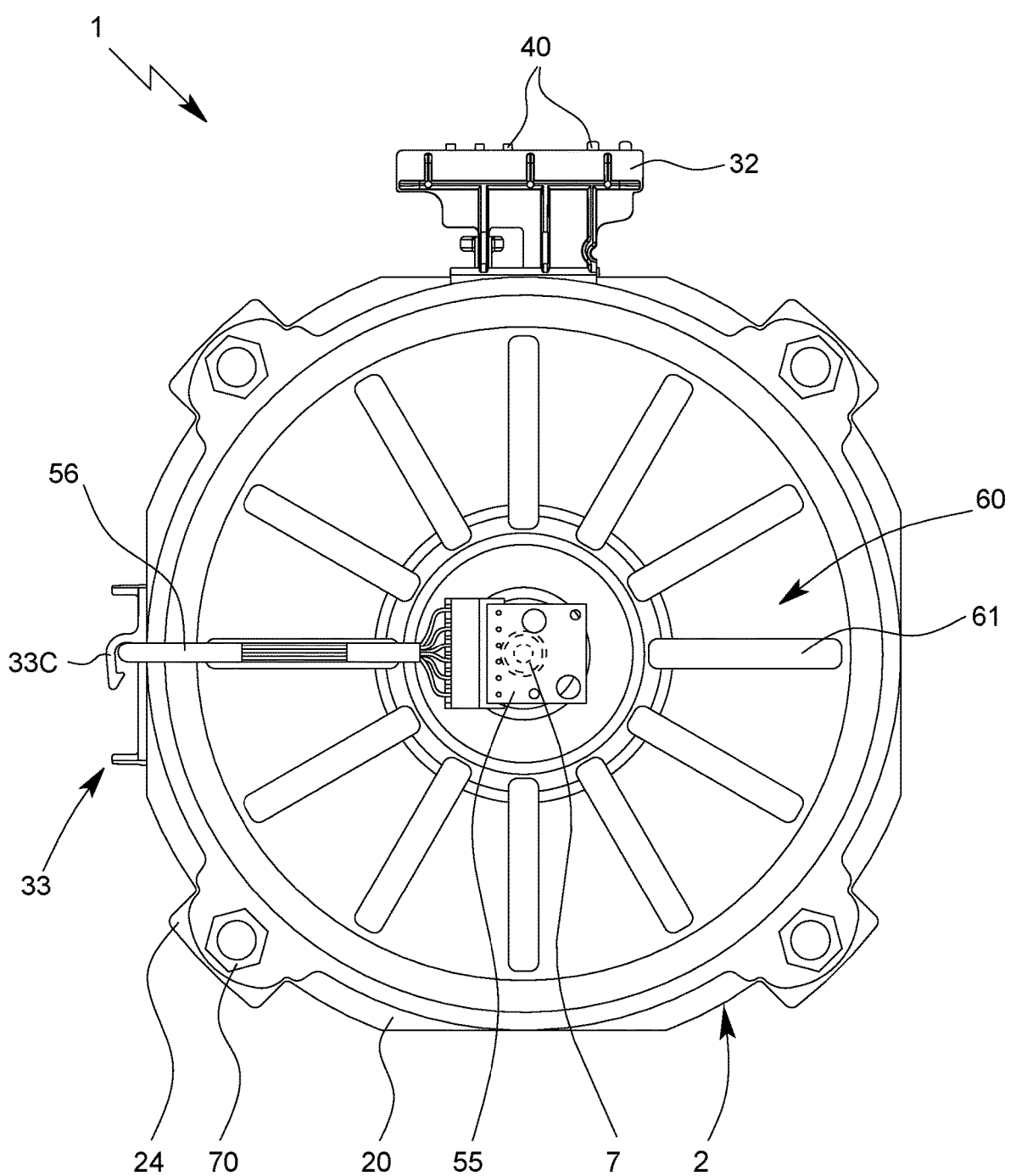
FIG. 8 is a plan view of the proposed electric motor with the stator according to the second embodiment, a bearing bridge and an angle of rotation sensor.

FIG. 8 shows the electric motor 1 in a schematic plan view. The electric motor 1 is shown here with a bearing bridge 60, which is designed in particular to support/bear the shaft 7.

The bearing bridge 60 is preferably fastened to the stator 2 and/or the stator 2 has the bearing bridge 60. In particular, the bearing bridge 60 is fastened, in particular screwed, to the stator core 20 by means of fastening elements 70, in particular screws. Preferably, the screw holes 24A of the stator core 20/projections 24 are or have been used for fastening the bearing bridge 60.

The bearing bridge 60 preferably has a plurality of ribs 61, in particular reinforcing or stiffening ribs. Furthermore, the bearing bridge 60 can also have recesses, in particular between the ribs 61 (not shown), in particular to ensure ventilation of the electric motor 1.

The electric motor 1, in particular the stator 2, preferably has two bearing bridges 60, the second bearing bridge 60 being fastened to the opposite axial side of the stator core which side is not visible in FIG. 8.

In the example shown in FIG. 8, the sensor device 50 preferably has a sensor 55 arranged in the region of the shaft 7 and/or centrally on the electric motor 1 and/or stator 2.

The sensor 55 is preferably designed as a Hall sensor and/or angle of rotation sensor, in particular for detecting the rotation of the rotor 3 and/or the shaft 7. The sensor 55, in particular designed as a Hall sensor, can also be provided or used for measuring other measurement variables.

The sensor 55 is preferably fastened to and/or held by the bearing bridge 60.

The sensor device 50 preferably has a sensor cable 56 for connecting the sensor 55, in particular for forwarding electrical signals from the sensor 55. Preferably, the sensor cable 56 connects the sensor 55 to the sensor connection 54.

The sensor cable 56 is preferably held and/or guided by the cable retainer 33C. In particular, the cable retainer 33C guides the sensor cable 56 to the sensor connection 54.

In this sense, a sensor holder 33 for a sensor device 50 can preferably also be understood as a holder that does not directly carry/hold a sensor, but only parts thereof, such as a printed circuit board 51, a connection 53, 54 and/or a sensor cable 56.

Particularly preferably, the sensor device 50 has both the sensor 52, in particular temperature sensor, and the sensor 55, in particular Hall sensor. The signals of the two sensors 52, 55 are preferably combined at the printed circuit board 51 and/or via the sensor connection 54.

Figure 9:
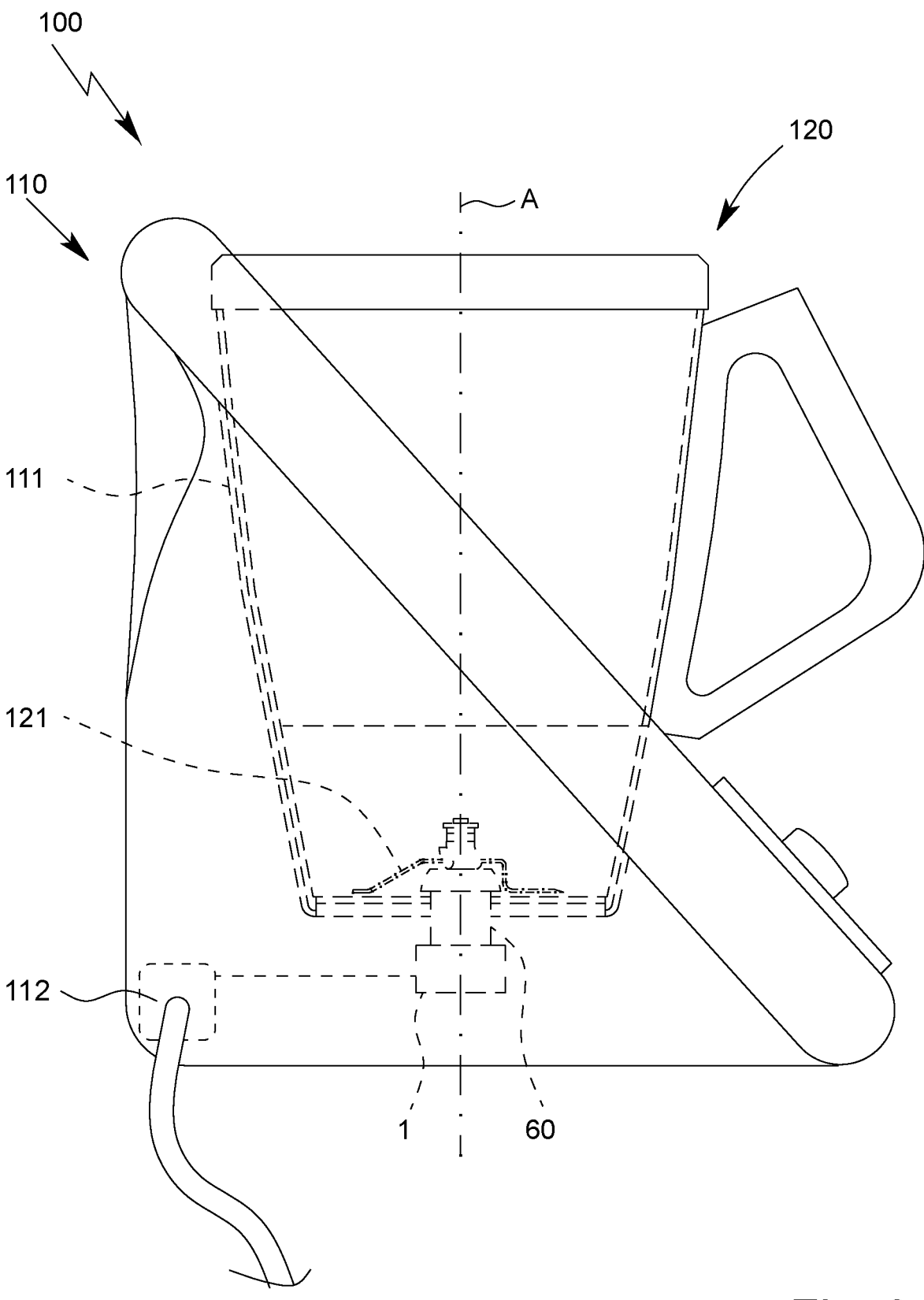
FIG. 9 is a side view of a proposed kitchen machine.

FIG. 9 schematically shows a proposed cooking apparatus/food processor/kitchen machine 100 for the preparation of meals and/or for the processing of food/ingredients. The kitchen machine 100 is preferably an electrically operated multi-functional kitchen machine/food processor designed for chopping, stirring/mixing and/or heating/cooking food.

The kitchen machine 100 preferably has a base station 110 and/or a vessel/container 120 to receive/hold food.

The base station 110 and the vessel 120 are preferably electrically and/or mechanically connected or connectable, in particular to allow heating and/or mixing/stirring of the food in the vessel 120.

FIG. 9 shows the kitchen machine 100 in its usual state of use and/or in the connection position, in which the vessel 120 is electrically and/or mechanically connected to the base station 110.

The base station 110 preferably has a receptacle 111 to receive/accommodate the vessel 120 at least partially and/or at the bottom. Particularly preferably, the vessel 120 is at least partially insertable or suspendable in the base station 110 in order to connect the vessel 120 mechanically and/or electrically to the base station 110.

The vessel 120 is equipped with a stirrer 121, in particular for comminuting/chopping and/or mixing/stirring food in the vessel 120. The stirrer 121 is preferably rotatably mounted and/or located at the bottom of the vessel 120. The stirrer 121 preferably has a plurality of, in particular exchangeable, stirring paddles/blades.

Preferably, the stirring blades have cutting edges or are designed as cutting blades to chop up food.

Preferably, the vessel 120 is mechanically connected or connectable to the base station 110 to drive the stirrer 121 by means of the base station 110.

To drive the stirrer 121, the kitchen machine 100, in particular the base station 110, has the electric motor 1, which is connected or connectable to the stirrer 121 via the shaft 7—optionally via a shaft attachment—and/or—in the connection position—engages positively/form-fittingly in the bottom of the vessel 120 from below.

Preferably, the rotation axis A of the electric motor 1 corresponds to the rotation axis of the stirrer 121 and/or to a central axis of the vessel 120, which extends centrally through the vessel 120, as indicated in FIG. 9.

Preferably, the central axis is a longitudinal or symmetrical axis of the preferably elongated, cylindrical and/or at least substantially rotationally symmetrical vessel 120.

The kitchen machine 100, in particular the base station 110, preferably has a power supply 112 for supplying electrical power to the electric motor 1, in particular its coils 11, and/or to other devices of the kitchen machine 100.

Depending on the rotational speed or number of revolutions of the stirrer 121 and/or electric motor 1, the kitchen machine 100 is preferably designed both for mixing/stirring (at low rotational speeds) and for comminuting/chopping (at high rotational speeds) ingredients. Particularly preferably, also slow mixing/stirring, for example at 10 rpm, and/or very fine or defined comminution/chopping, for example at 10,000 rpm, is possible.

Individual aspects, features and/or method steps of the present invention can be implemented independently, but also in any combination and/or sequence.

LIST OF REFERENCE SIGNS

1 Electric motor
2 Stator
3 Rotor
4 Permanent magnet
5 Rotor core
6 Fan
7 Shaft
10 Coils
11 Coil wire
20 Stator core
21 Opening
22 Stator yoke
22A Outer side
22B Inner side
23 Stator tooth
23A Tooth body
23B Tooth head
23C Tooth head face
24 Projection
24A Screw hole
Winding space
26 Slot
27 Stator sheet
27A Punch area
30 Coil carrier
31 Winding portion
32 Connection holder
32A Radial portion
32B Axial portion
32C Protruding portion
32D Contact portion
32E Star point portion
32F Guide projection
32G Rib
33 Sensor holder
33A Radial portion 33B Axial portion
33C Cable retainer
33D Fastening portion
34A First collar
34B Second collar
35 Connecting wall
36 Through opening
40 Connection device
41 Electrical connection contacts
42 Terminal (electrical connection)
42A Terminal slot
43 Star point
44 Terminal (star point)
44A Terminal slot
44B Contact bridge
50 Sensor device
51 Sensor plate
52 Sensor (temperature sensor)
53 Electrical connection
54 Sensor connection
55 Sensor (Hall sensor)
56 Sensor cable
60 Bearing bridge
61 Rib
70 Fastening element
100 Kitchen machine
110 Base station
111 Receptacle
112 Power supply
120 Vessel
121 Stirrer
A Rotation axis

The invention claimed is:

1. An electric motor comprising:
a rotor and a stator, the rotor being rotatable about a rotation axis relative to the stator,
wherein the stator comprises a stator core, a plurality of coils, and a coil carrier for the coils,
wherein the coil carrier is produced in one piece by injection molding onto the stator core and has at least one holder arranged radially on the outside of the stator core, the holder holding a sensor device,
wherein the holder comprises a radial portion and an axial portion, the holder engaging around the stator core with the axial portion and the radial portion,
wherein the radial portion extends radially outwardly along an axial end face of the stator core, and wherein the axial portion extends along an outer side of the stator core,
wherein the sensor device comprises a sensor configured to measure variables of the coils, and
wherein the sensor is held by the holder and arranged axially above the coils.

2. The electric motor according to claim 1, wherein the sensor device comprises a temperature sensor and/or a Hall sensor.

3. The electric motor according to claim 1, wherein the sensor device or a sensor plate of the sensor device is heat staked to the holder.

4. The electric motor according to claim 1, wherein the holder forms a cable retainer for a cable of the sensor device.

5. The electric motor according to claim 1, wherein the coil carrier is materially and/or adhesively bonded to the stator core.

6. The electric motor according to claim 1, wherein the coil carrier engages around the stator core and/or forms a form fit with the stator core in the axial direction, in the radial direction and in the circumferential direction.

7. The electric motor according to claim 1, wherein the coil carrier has a plurality of holders spaced apart from one another, which are each arranged radially on the outside of the stator core.

8. The electric motor according to claim 7, wherein one of the plurality of holders is formed as a connection holder and holds a connection device, and wherein another one of the plurality of holders is formed as a sensor holder and holds the sensor device.

9. The electric motor according to claim 1, wherein the stator has exactly twelve coils and/or the stator core has exactly twelve stator teeth for the coils.

10. The electric motor according to claim 1, wherein the stator core has at least one of:
an inner diameter of at least 70 mm and at most 85 mm,
an outer diameter of at least 120 mm and at most 165 mm,
a height of at least 15 mm and at most 25 mm, or
a yoke thickness of at least 6 mm and at most 12 mm.

11. The electric motor according to claim 1, wherein the stator core has a plurality of stator teeth, with at least one of:
each stator tooth having a radial extent of at least 10 mm and at most 22 mm and/or an extent in the circumferential direction of at least 10 mm and at most 20 mm, or
a slot being formed between each two stator teeth, which slot has a width of at least 3 mm and at most 6 mm.

12. The electric motor according to claim 1, wherein the stator core is formed by at least 35 and at most 45 stacked stator sheets.

13. The electric motor according to claim 1, wherein the coils each have at least 150 turns and at most 190 turns and/or a bare wire diameter of at least 0.2 mm and at most 0.6 mm.

14. The electric motor according to claim 1, wherein the coil carrier is made of polyamide.

15. The electric motor according to claim 1, wherein the electric motor comprises a connection device held by the holder or by a second holder of the coil carrier.

16. The electric motor according to claim 15, wherein the connection device comprises electrical connection contacts for the coils and/or a star point of an interconnection of the coils.

17. The electric motor according to claim 15, wherein the connection device comprises a terminal forming a star point of an interconnection of the coils.

18. A kitchen machine comprising:
an electric motor,
the electric motor having a rotor and a stator, the rotor being rotatable about a rotation axis relative to the stator,
the stator comprising a stator core, a plurality of coils, and a coil carrier for the coils,
wherein the coil carrier is produced in one piece by injection molding onto the stator core and has at least one holder arranged radially on the outside of the stator core, the holder holding a sensor device,
wherein the holder comprises a radial portion and an axial portion, the holder engaging around the stator core with the axial portion and the radial portion, wherein the radial portion extends radially outwardly along an axial end face of the stator core, and wherein the axial portion extends along an outer side of the stator core,
wherein the sensor device comprises a sensor configured to measure variables of the coils, and
wherein the sensor is held by the holder and arranged axially above the coils.

19. A method of manufacturing an electric motor having a stator and a rotor rotatable relative to the stator about a rotation axis, comprising:
producing a coil carrier of the stator by injection molding onto a stator core, the coil carrier being produced with at least one holder which is arranged radially on the outside of the stator core and is designed to hold a sensor device,
producing the holder to comprise a radial portion and an axial portion, the holder engaging around the stator core with the axial portion and the radial portion, the radial portion extending radially outwardly along an axial end face of the stator core, and the axial portion extending along an outer side of the stator core,
providing the sensor device with a sensor configured to measure variables of the coils, the sensor being held by the holder and arranged axially above the coils.

20. The method according to claim 19, further comprising producing the coil carrier in such a way that it engages around the stator core and/or is materially and/or adhesively bonded to the stator core and/or forms a form fit with the stator core in the axial direction, in the radial direction and in the circumferential direction.

21. The method according to claim 19, further comprising heat staking the sensor device or a sensor plate of the sensor device to the holder.

22. An electric motor comprising:
a rotor and a stator, the rotor being rotatable about a rotation axis relative to the stator,
wherein the stator comprises a stator core, a plurality of coils, and a coil carrier for the coils,
wherein the coil carrier is a one piece injection molded design molded onto the stator core and has a plurality of holders arranged radially on the outside of the stator core,
wherein each holder comprises a respective radial portion and a respective axial portion, each holder engaging around the stator core with the respective axial portion and the respective radial portion,
wherein each radial portion extends radially outwardly along a respective axial end face of the stator core, and wherein each axial portion extends along a respective outer side of the stator core,
a sensor device mounted on at least one holder,
a connection block with one or more electrical connections that supply energy to the electric motor mounted on another one of the at least one holders,
wherein the sensor device comprises a sensor configured to measure variables of the coils, and
wherein the sensor is held by the respective holder and arranged axially above the coils.

* * * * *